United States Patent
Harradine et al.

(10) Patent No.: US 7,702,219 B2
(45) Date of Patent: Apr. 20, 2010

(54) AUDIO AND/OR VIDEO GENERATION APPARATUS AND METHOD OF GENERATING AUDIO AND/OR VIDEO SIGNALS

(75) Inventors: Vincent Carl Harradine, Burlington (CA); Alan Turner, Basingstoke (GB); Richard Daniel Foster, Fordingbridge (GB); Martin Rex Dorricott, Basingstoke (GB); Mark John McGrath, Bracknell (GB)

(73) Assignee: Sony United Kingdom Limited, Weybridge (GB)

( * ) Notice: Subject to any disclaimer, the term of this patent is extended or adjusted under 35 U.S.C. 154(b) by 2227 days.

(21) Appl. No.: 10/016,823

(22) Filed: Dec. 4, 2001

(65) Prior Publication Data

US 2002/0136531 A1   Sep. 26, 2002

Related U.S. Application Data

(63) Continuation of application No. PCT/GB01/01454, filed on Mar. 30, 2001.

(30) Foreign Application Priority Data

| Apr. 5, 2000 | (GB) | 0008393.1 |
| Apr. 5, 2000 | (GB) | 0008427.7 |
| Apr. 5, 2000 | (GB) | 0008431.9 |

(51) Int. Cl.
H04N 5/91 (2006.01)
H04N 7/00 (2006.01)
H04N 5/00 (2006.01)

(52) U.S. Cl. .......................... 386/117; 386/46
(58) Field of Classification Search ................ 386/1, 386/39, 95, 69–70, 45–46, 125–126
See application file for complete search history.

(56) References Cited

U.S. PATENT DOCUMENTS 4,963,994 A * 10/1990 Levine ...................... 386/83

(Continued)

FOREIGN PATENT DOCUMENTS

EP   0 667 609   8/1995

(Continued)

OTHER PUBLICATIONS

SMPTE Journal, *Proposed SMPTE Standard for Television—Unique Material Identifier (UMID)*, vol. 109, No. 3, Mar. 2000, pp. 221-225.

Primary Examiner—Thai Tran
Assistant Examiner—Nigar Chowdhury
(74) Attorney, Agent, or Firm—Oblon, Spivak, McClelland, Maier & Neustadt, L.L.P.

(57) ABSTRACT

An audio and/or video generation apparatus comprises a recording processor which is operable to record audio and/or video signals on a recording medium, a meta data generation processor which is operable to generate meta data identifying the content of the audio/video signals, and a communications processor which arranged to communicate the meta data separately from the recording medium.

Furthermore, the meta data generation processor may be operable to generate at least one sample image which is representative of a video image from the recorded video signals, and to associate the sample image with an address on the recording medium at which the video image is recorded. The video and/or audio generation apparatus provides an advantage in generating and utilising meta data to facilitate the generation of audio/video productions. Accordingly, a system for generating an audio and/or video production comprises an acquisition processor operable in use to receive instructions from a user which instructions are representative of a list of content items for the audio and/or video production. The audio and/or video generation apparatus is arranged in use to receive information representative of the list of content items, and to generate audio and/or video signals in accordance with the content items on the list. An ingestion processor may be provided to receive the list of content items, and the audio and/or video signals and to form the audio and/or video production by associating the audio and/or video signals with the list of content items.

46 Claims, 14 Drawing Sheets

U.S. PATENT DOCUMENTS

| | | | |
|---|---|---|---|
| 5,052,040 A * | 9/1991 | Preston et al. ............... 713/165 |
| 5,781,730 A | 7/1998 | Reimer et al. |
| 5,889,916 A | 3/1999 | Kimura et al. |
| 5,910,825 A | 6/1999 | Takeuchi |
| 5,974,218 A | 10/1999 | Nagasaka et al. |
| 6,330,392 B1 * | 12/2001 | Nakatani et al. ............... 386/52 |
| 6,532,039 B2 * | 3/2003 | Anderson ................ 348/231.3 |
| 6,670,966 B1 * | 12/2003 | Kusanagi ..................... 715/723 |
| 6,760,042 B2 * | 7/2004 | Zetts .......................... 715/716 |
| 6,766,098 B1 * | 7/2004 | McGee et al. ................. 386/46 |

FOREIGN PATENT DOCUMENTS

| | | |
|---|---|---|
| EP | 0 803 873 | 10/1997 |
| EP | 0 810 794 | 12/1997 |
| EP | 0 841 665 | 5/1998 |
| EP | 0 851 680 | 7/1998 |
| EP | 0 915 471 A2 | 5/1999 |
| EP | 0 917 148 | 5/1999 |
| GB | 2 296 600 | 7/1996 |
| GB | 2 300 535 | 11/1996 |
| GB | 2 312 078 A | 10/1997 |
| GB | 2 316 527 | 2/1998 |
| GB | 2 332 556 | 6/1999 |
| JP | 2000-83208 | 3/2000 |
| WO | WO 96/17451 | 6/1996 |
| WO | WO 96/19779 | 6/1996 |
| WO | WO-97/39411 | 10/1997 |
| WO | WO 00/10329 | 2/2000 |

* cited by examiner

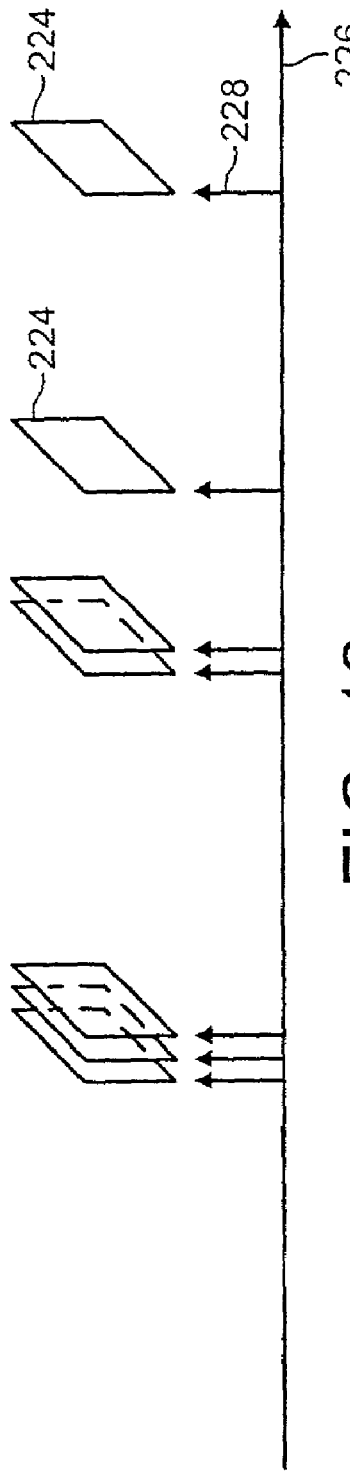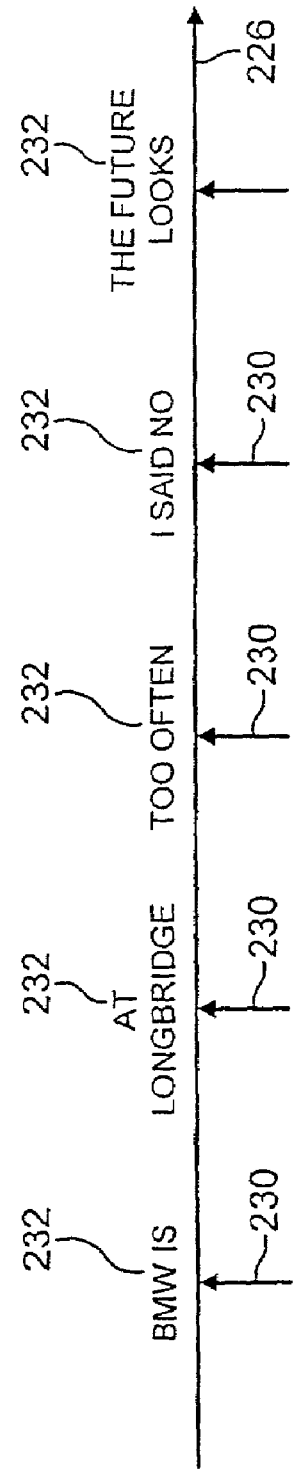
FIG. 12a
FIG. 12b

AUDIO AND/OR VIDEO GENERATION APPARATUS AND METHOD OF GENERATING AUDIO AND/OR VIDEO SIGNALS

This is a continuation of copending International Application PCT/GB01/01454 having an international filing date of 30 Mar. 2001.

FIELD OF THE INVENTION

The present invention relates to audio and/or video generation apparatus and methods of generating audio and/or video signals. The present invention also relates to systems for facilitating the generation of audio and/or video productions.

The present invention also relates to acquisition processors for use in generating audio and/or video productions, and audio and/or video generation apparatus.

BACKGROUND OF THE INVENTION

The subject matter and content of audio and video productions varies greatly. In addition, to this variety there is, correspondingly, a considerable quantity of such audio and video productions. The quantity has been required to meet the demand from the broadcast and entertainment industries. The audio productions include, for example, radio broadcasts, both live and pre-recorded, musical and audio recordings, whereas video productions include, for example, films, television programs and video recordings. As will be appreciated typically video productions also include an accompanying sound track or commentary, so that an audio production is inherently included as part of the video production.

The term audio and/or video will be used herein to refer to any from of audio information or signals, video information or signals, or a combination of video and audio information or signals. The term audio/video will be used for short to refer to audio and/or video.

As a result of the great variety and considerable quantity of audio/video productions, the task of locating particular content items of audio/video material within an archive of audio/video productions represents an arduous and labour intensive task, because an operator must visually search the audio/video productions for the desired content item. Furthermore, because of the length of audio/video productions which are typically although not exclusively stored on linear recording media, the task of navigating through the media to locate particular content items of audio/video material from an audio/video production is time consuming and labour intensive.

The content of audio/video material is typically stored in a form which does not readily allow access to the content of the audio/video signals. This is particularly so, if the audio/video signal is compressed in some way. For example video cameras and camcorders are arranged conventionally to record a video signals representing the moving images falling within a field of view of the camera on a video tape. Once the video signals have been recorded on to the video tape, a user cannot determine the content of the video tape without reviewing the entire tape. Furthermore, because video tape is an example of a linear recording medium, the task of navigating through the media to locate particular content items of video material is time consuming and labour intensive. As a result during an editing process in which selected items from the contents of the video tape are combined in an order which may be different to that in which they were recorded, it may be necessary to review the entire contents of the video tape in order to identify the selected items. As will be understood from the foregoing discussion the audio/video material may be recorded on any medium, so that it remains a technical problem to identify the content of audio/video material for post production and archiving regardless of the recording medium, which may be a disc or a tape.

SUMMARY OF THE INVENTION

According to the present invention there is provided an audio and/or video generation apparatus which is arranged in operation to generate audio and/or video signals, the audio and/or video generation apparatus, comprising a recording means which is arranged in operation to record the audio and/or video signals on a recording medium, a meta data generation processor which is arranged in operation to generate meta data identifying the content of the audio/video signals in response to the audio/video signals, and a communications processor which is operable to communicate the meta data separately from the recording medium.

As will be understood from the foregoing discussion, rapid identification of the content of audio/video material for asset management or for facilitating editing of the audio/video material, provides a considerable advantage and benefit, in particular to producers of audio/video material. The audio/video generation apparatus provides this advantage and benefit by including a communications processor in combination with a meta data generator to communicate meta data describing the contents of the audio/video material separately to the recording medium. The meta data can therefore be received in advance of the recording medium to identify which parts of the content are relevant to the editor, or to store the meta data in an asset management system so that the content of the recording medium can be rapidly assimilated.

To provide a further improvement in a time taken to identify parts of the content of the audio/video material to be used, for example, by an editor, the meta data generation processor may be arranged in operation to receive a pre-defined list of takes of audio/video signals to be generated, the meta data generation processor being arranged in operation to generate the meta data in association with the list of takes, and the communications processor may be arranged to communicate the meta data in association with the list of takes. A planned list of takes is identified at a planning stage of a program which is to be made using the content of the video signals. A number of shots are made, and by associating each of these shots with the planned list of takes which are identified using corresponding meta data, editing and producing the program is made correspondingly more efficient.

In preferred embodiments, the meta data generated by the meta data generation processor may be at least one picture which is representative of an image from the recorded video signals. The picture therefore provides an indication of the content of the video signals as they are being generated and recorded. This provides a particular advantage in providing the producer or director of the program for which the content of the audio/video material is being generated to monitor the content of the audio/video material as it is being acquired. The producer or director may even be remotely located at for example a production studio whereas the video material is being captured and recorded at an outside location. In this way the remotely located producer or director may give feed back as to whether the video material is appropriate for the program, whilst a camera crew generating the video material is still at the outside location.

The meta data processor may be arranged in operation to associate the picture which is representative of the image from the recorded video signals with an address on the recording medium at which the image is recorded, the address forming part of the meta data communicated by the communications processor. Communicating the address at which the image corresponding to the picture is recorded, provides a further advantage in identifying the place at which the video material is recorded. If, for example, the image is pleasing to the editor it can be accessed rapidly from the recording medium using the associated address.

In preferred embodiments, the meta data may also include the in and out points of a take of the audio/video signals.

It will be understood by those skilled in the art that a 'take' is a portion of continuous action captured and recorded by a video camera. Several takes may be generated for a single shot and one or more takes may be selected for each shot. When recorded, each take has an in and an out point at the point on the tape where the take starts and the point on the tape where the takes ends. Therefore by communicating the in and out points as part of the meta data, a take can be identified and quickly recovered from the recording medium.

In a preferred embodiment the audio and/or video generation apparatus may be a video camera, camcorder, television camera, cinema camera or the like.

According to an aspect of the present invention there is provided an apparatus for receiving and displaying the meta data communicated by the audio and/or video generation apparatus.

According to an aspect of the present invention, there is provided a meta data generation apparatus comprising a meta data generation processor which is arranged in operation to receive audio and/or video signals representative of an audio and/or visual source, and to generate meta data identifying the content of the audio/video signals in response to the audio/video signals, and a communications processor which arranged to communicate the meta data separately from the recording medium.

According to another aspect of the present invention there is provided a video generation apparatus which is arranged in operation to generate video signals representative of an image source, the video generation apparatus comprising a recording processor which is arranged in operation to record the video signals on a recording medium, and a meta data generation processor which is arranged in operation to receive the video signals and to generate at least one sample image which is representative of a video image from the recorded video signals, and to associate the sample image with an address on the recording medium at which the video image is recorded.

Once the video material has been captured from a source and recorded on to a recording medium, the recorded material is not in a form in which the content of that material can be easily determined, without having to replay the recorded material. Therefore, by generating a sample image which provides a representation of a video image produced from the recorded video material and storing this sample image separately from the recorded video signals with an address of that video image on the recording medium, a user is provided with an indication of the content of the recorded video signals without having to view the recorded video signals.

A further improvement is provided where the at least one sample image is first and second sample images, the first sample image being generated for a video image at an in point of the at least part of the video signals and the second sample image being generated for a video image at an out point of the at least part of the video signals, and the address is a first and second address, the first address indicating the place on the recording medium at which the in point video image is recorded, and the second address indicating the place on the recording medium at which the out point video image is recorded.

Providing sample images at the in point and the out point of a take provides a facility for an editor to rapidly determine which of a plurality of takes to select and use in the final edited video production.

Alternatively in a further embodiment, the video generation apparatus is further provided with an activity detector coupled to the meta data generation processor and arranged in operation to receive the video signals and to generate an activity signal indicative of a relative change of content of the video signals, wherein the meta data generation tool is arranged in operation to generate a plurality of sample images, each of which is representative of a video image from the recorded video signals at a different time, the sample images being generated at times of change of content of the video signals indicated by the activity signal, an address of each of the sample images providing the location on the recording medium at which the corresponding video image is recorded. This alternative embodiment provides an indication automatically of the content of the recorded video signal. The sample images are concentrated around points in the video material when the content changes, such as for example when a scene changes. Therefore by increasing an amount of the sample images around places on the recording medium where the content is changing, an editor is provided with a rapid indication of the content of the recorded video signals without having review all the recorded video signals.

The sample images can provide a static representation of the moving video images which facilitates navigation by providing a reference to the content of the moving video images.

In other embodiments of the invention an audio signal is generated with the video signals, and the activity detector generates an activity signal indicative of the start of speech. The meta data generator may further operate to generate data representative of the content of the speech. This may be in the form of text.

As already explained, the video signals may be generated from a plurality of takes each of which correspond to a video material item. As such, the video signals are representative of a plurality of video material items.

In preferred embodiments, the meta data generation processor may be arranged in operation to generate a preference marker, which is associated with selected ones of the video material items in response to commands from a user. An improvement in the efficiency with which a video production may be edited is provided through a facility for adding a preference marker to the items of video material formed from the takes at acquisition. The preference marker can be used to provide an indication of the items of video material which are preferred from a set of items, which are to be used to form an edited video production. This represents a pre-editing facility, which can be used to reduce a time taken to form the video production. Furthermore, the meta data generation processor may be arranged in operation to record data representative of the preference marker on the recording medium. The video production may be formed by ingesting and combining only those items of video material from the recording medium which have the preference marker, thereby providing at least a first edited version of the video production.

Preferably, the video generation apparatus comprises a data store coupled to the meta data generation processor, the at least one sample image and the address being stored in the data store separately from the recording medium. An advantage is provided in storing the sample images separately from the recorded video signal in that the contents of the recorded video signal can be view using a separate medium. Alternatively the contents can be communicated separately from the recording medium and reviewed separately reducing a time for generating an edited version of the video signals.

In one embodiment, the recording medium is a random access memory, and the address indicates a place in the memory where the image is recorded. In another embodiment the recording medium is a linear recording medium and the address is a time code corresponding to a place on the recording medium where the image is recorded.

Advantageously in order to reduce an amount of data which must be stored or communicated, the meta data processor may generate the sample images in accordance with a compression encoding process such as the Joint Photographic Experts Group compression encoding process.

The term meta data as used herein refers to and includes any form of information or data which serves to describe either the content of audio/video material or parameters present or used to generate the audio/video material or any other information associated with the audio/video material. Meta data may be, for example, "semantic meta data" which provides contextual/descriptive information about the actual content of the audio/video material. Examples of semantic meta data are the start of periods of dialogue, changes in a scene, introduction of new faces or face positions within a scene or any other items associated with the source content of the audio/video material. The meta data may also be syntactic meta data which is associated with items of equipment or parameters which were used whilst generating the audio/video material such as, for example, an amount of zoom applied to a camera lens, an aperture and shutter speed setting of the lens, and a time and date when the audio/video material was generated. Although meta data may be recorded with the audio/video material with which it is associated, either on separate parts of a recording medium or on common parts of a recording medium, meta data in the sense used herein is intended for use in navigating and identifying features and essence of the content of the audio/video material, and may, therefore be separated from the audio/video signals when the audio/video signals are reproduced. The meta data is therefore separable from the audio/video signals.

According to another aspect of the present invention, there is provided a meta data generation processor which is arranged in operation to receive video signals being recorded and to generate at least one sample image which is representative of an image from the video signals being recorded, and to associate the sample image with an address on a recording medium at which the image is being recorded.

According to another aspect of the present invention there is provided a system for generating an audio and/or video production comprising an acquisition processor operable in use to receive instructions from a user which instructions are representative of a list content items for the audio and/or video production, an audio and/or video generation apparatus arranged in operation to receive information representative of list of the content items, and operable in use to generate audio and/or video signals in accordance with the content items of the list, and an ingestion processor which is arranged in operation to receive the list of content items, and the audio and/or video signals and to associate the audio and/or video signals with the list of content items, and to form the production by associating the audio and/or video signals with the list of content items.

Although it is conventional to acquire items of audio/video material from a source and to edit these items to form an audio/video production, the present invention recognises an advantage in pre-planning audio/video material items and providing a system for effecting the process of generating such productions. Accordingly, a system is provided with an acquisition processor which receives instructions which are representative of a list of content items for the audio and/or video production. An audio and/or video generation apparatus receives an indication from the acquisition processor of which of the items from the list audio/video signals are to be acquired from a source, and generates audio and/or video signals in association with the communicated content item. After acquiring the audio/video material items an ingestion processor is arranged to apply the list of content items to the audio and/or video signals. In effect the audio/video production is formed from the association of the audio and/or video signals with the list of content items. The efficiency with which the audio/video production is generated is improved, and in addition the pre-planned production information in the form of the list of content items can be re-used repeatedly, thereby adding value to future productions.

According to an aspect of the present invention there is provided an acquisition processor comprising a control processor coupled to a data store, a user interface coupled to the control processor for receiving commands from a user, and a communications interface coupled to the control processor and arranged in operation to receive data representative of a pre-planned audio/video material items, wherein said control processor is arranged in use to communicate data indicative of a next audio/video material item to be generated to an audio/video generation apparatus.

According to an aspect of the present invention there is provided an audio and/or video generation apparatus for generating audio and/or video signals, the audio and/or video generation apparatus comprising a recording means which is arranged in operation to record the audio and/or video signals on a recording medium, a communications interface arranged in operation to receive data indicative of at least one of a plurality of pre-planned audio/video material items, and a metadata generation processor coupled to the communications interface and to the recording means and arranged in operation to generate metadata identifying at least one audio/video material item recorded on to the recording medium corresponding to the at least one pre-planned audio/video material item.

Various further aspects and features of the present invention are defined in the appended claims.

BRIEF DESCRIPTION OF THE DRAWINGS

Embodiments of the present invention will now be described by way of example with reference to the accompanying drawings wherein:

FIG. 12a is a schematic representation of the generation of picture stamps at sample times of audio/video material, FIG. 12b is a schematic representation of the generation of text samples with respect to time of the audio/video material, FIG. 13 provides as illustrative representation of an example structure for organising meta data.

DESCRIPTION OF PREFERRED EMBODIMENTS

Integrated System

Figure 16:
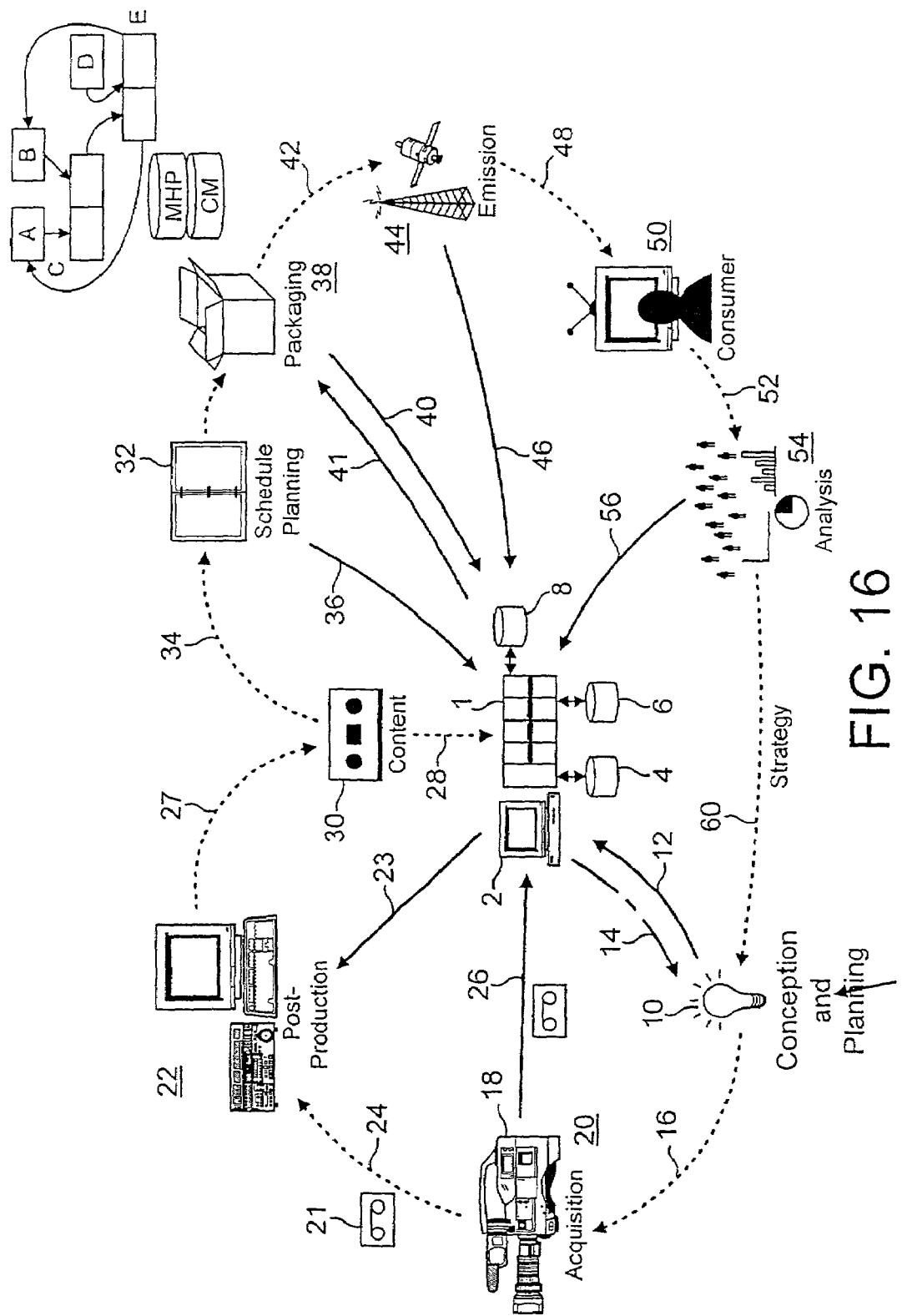
FIG. 16 is schematic representation of an integrated system for planning, acquisition, production and emission of audio/video programs.

An integrated system for uniquely identifying and tracking audio/video material items, in order to facilitate planning, acquisition and generation of audio/video productions will now be described with reference to FIG. 16. In general, the integrated system according to FIG. 16 provides a facility for identifying items of audio/video material within an audio/video production as well as the audio/video production itself, from conception, to acquisition, to generation, to viewing and analysis. This integrated system can be used to facilitate copyright licensing and billing for use of particular audio/video material items. As will be explained, the system for identifying uniquely the audio/video material items and the audio/video productions provides a facility for planning subsequent audio/video productions in accordance with previously produced audio/video productions and consumer analysis information representing the relative audience for these audio/video productions. The planning information, which was used to generate the audio/video production, and the consumer analysis information indicating a relative success of the audio/video production is fed back to enrich a knowledge base for generating subsequent productions.

FIG. 16 provides an illustrative representation of the integrated system for the planning, acquisition, production, emission and analysis of audio/video productions. In FIG. 16 an asset management system 1 is shown to comprise a data processor 2 which is arranged in operative association with a first program database 4, a rights database 6, and a consumer analysis database 8 the purpose and function of which will be explained shortly. The asset management system 1 is arranged to maintain a database in which Unique Metadata Identifier (UMID) which uniquely identifies items of audio/video material are associated with a Unique Program Identifier (UPID) which uniquely identifies a program. A program is an audio/video production which is comprised of a combination of items audio/video material items, some of which may be generated during an acquisition stage of the system. As a result each UPID will be associated with at least one UMID representing the audio/video material from which the program corresponding to the UPID is comprised.

The generation of the UPID in associate with the UMID will now be explained. At a first planning and concept stage 10 a format or sequence of audio/video material is identified. This is typically identified as a combination of scenes and within each scene a number of shots which represent action events within the scene. However each shot may require a number of takes. A take is an item of content from which audio/video material is generated which may result, for example, from a camera taking real time action which is recorded as a continuous event. The planning stage might also identify product placements and sponsorship items which must be included within the audio/video program. As represented by an arrow 12 it is at this stage which a UPID is assigned to the audio/video program. In preferred embodiments the asset management system is a central registry and the assignment of UPID is effected by sale, providing the unique UPID in exchange for money. The producers of the audio/video program at the planning and concept stage 10, may also interrogate the asset management system for viewing figures produced when similar audio/video programs have been previously shown. This is also held in the asset management system 1 which is populated, as will be described shortly, with viewing figures captured when an audio/video program is emitted. Hence the viewing figures which form part of a collection of strategic information is received at the planning and concept stage 10 as represented by the broken line 14.

The term emitted will be used to described the distribution of the audio/video program on any medium, which includes terrestrial and satellite broadcast, as will as sale on video tape and digital versatile disc.

As indicated by the clockwise broken line arrow 16 the next stage in the system is the acquisition of the audio/video material from which the audio/video program is to generated. Therefore based on the planning information produced at the concept stage 10, the audio/video generation apparatus such as a camera 18 at the acquisition stage 20 is used by a camera crew to generate the audio/video material in accordance with the planning information. This might be for example at a sound stage or a similar environment such as an outside broadcast. The planning information however is not discarded at this stage but retained and passed with the audio/video material to a production stage 22 which is the next stage via the anti-clockwise arrow 24. However the planning information is also stored in the asset management system 1 for use in generating future audio/video programmes of a similar nature. This is represented by the arrow 26. At the acquisition stage 20 UMIDs are generated in association with the audio/video material items generated. Thus, for each take produced by the camera 18 a UMID is generated in association with that audio/video material. The UMIDs are then also transferred via the connecting arrow 26 to the asset management system 1 and stored in association with the UPID previously set up at the planning and conception stage 10. Additionally, UMID can be associated with a task or short storyboard position which itself is associated with the UPID. The audio/video material may be for example recorded onto a tape 21 which may include the UMIDs associated with the items of audio/video material. The tape is therefore representative of the audio/video material so far generated and from which the program is to be reproduced. The tape is therefore passed via arrow 24 to an editing stage which is represented generally as a post production stage 22.

During editing, items of audio/video material are combined from a greater set of audio/video material produced at the acquisition stage 20. This facilitated by additional information introduced at the acquisition stage 20, at which a plurality of takes are typically produced for each shot whereas in fact only one take is typically required for each shot to fulfill requirements of the program. Therefore, from a plurality of takes at least one is selected. The preferred shot may be indicated by a so called 'Good Shot Marker' (GSM) which then appears as metadata. The GSM may be added to the medium on which the audio/video material is recorded, such as the video tape 10, or may be stored separately with associated time codes indicating the in and out points of the take. The GSM is then combined with the metadata and UMID associated with the audio/video material item and stored as a data structure within the asset management system. This data structure forming the asset management of the data base will be described in a separate section. However the GSM is used during the post production stage to enable an efficient identification of the takes which are to be used to form the shots of the scenes. Furthermore, at the post production stage 22, other audio/video material may be combined with the material generated at the acquisition stage 20. The combined material is then assigned a further UMID, which is also stored in the asset management data base.

The editing performed at the post production stage 22 may make use of the planning information, received from the asset management system 1 as indicated by an arrow 23. This information may be used for example to ensure that product placements within the audio/video material items and sponsorship material is maintained in the edited version of the program.

As a result of the editing process, the audio/video material from which the program has been formed is now a reduced sub-set from that produced at the acquisition stage 20, but may also include audio/video material from archives or animation or graphics. As such the UMIDs which identify each item of audio/video material will have changed from the set of UMIDs identifying the audio/video material from that received from the acquisition stage 20. As a result an updated set of UMIDs associated with the UPID is communicated to the asset management system as represented by the arrow 28 which represents the audio/video material within the audio/video production represented on a storage medium 30. Furthermore, at the post production stage 22 the audio/video material associated with these UMIDs may be stored in the data base. The content of the audio/video program is therefore that produced from the editing at the post production stage 22. From the audio/video program 30, the next stage is a scheduling stage 32 which is introduced, in order to schedule the emission of the audio/video program which is therefore received via the connecting arrow 34. At the schedule planning stage 32 a time at which the audio/video program is, for example, to be broadcast is identified and a corresponding timeslot assigned which corresponds to the length of the time available. At this stage the UPID is mapped to a program identifier with the date and time of scheduling for broadcast of the program. As a result this information is also fed back to the asset management system 1 (represented as an arrow 36) so that the program identifier and date and time of scheduling can be associated with the UPID.

After the planning and scheduling stage 32 the video program is then packaged at a stage 38. At the packaging stage 38 character merchandising deals are identified in association with the characters which may appear in the audio/video program. Furthermore the advertisements and trailers are associated with the audio/video program. However with assistance of the UMIDs and the planning information held in the asset management system 1, the character merchandising deals may be identified in correspondence with the content of the audio/video material as described by the UMIDs. Furthermore in accordance with the planning information which identifies the product placements and sponsorship, advertisements can be appropriately selected to accompany the audio/video program. Again this is all achieved by interrogating the asset management system 1 which is represented by a further arrow 40, 41. Finally as represented by the clockwise arrow 42, the packaged program is sent for emission at a broadcast stage 44 on an appropriate format. The appropriate format may be for example digital video broadcasting in which case the program identifier may be added. The program identifier may be for example the transport identifier which is used to identify DVB packets forming a program, within a multiplexed stream of packets for other programs. However at the emission stage 44, the final version of the program to be broadcast is monitored so as to establish exactly what has been emitted. To this end, a further modification of the UMIDs associated with the UPID may be made to the effect that the content of the audio/video program in the form in which it is to be emitted is identified by logging the UMIDs associated with the content of the emitted program. However this may require the combination of UMIDs which describe the content of the audio/video program which has been adapted for emission. This is because the version of the program formed for emission may contain the content items of the un-adapted program and content items added to a particular version such as advertising material. As such, a hierarchical formation of UMIDs is required in which the UMIDs which describe the content of the un-adapted program and the UMIDs which describe the content of the additional material are combined to form a new UMID. The new UMIDs include a reference to the combined content items as a reference to the UMIDs which described theses content items in a recursive fashion. This is illustrated in FIG. 16, by boxes A and B, which represent UMIDs which described different content items of the un-adapted program. A new UMID for the program is illustrated as box C, which refers back to the UMIDs A and B. When the program is adapted for emission, further material is added. The UMID associated with this further material is represented by a UMID D. When the program is adapted for emission and the original content and the further material is formed, a new UMID E is formed to represent the content of the adapted version. The new UMID E is arranged to refer back to UMIDs A and B in a hierarchical fashion.

There may be different versions of the same program issued on different media. For example the form of the program which is broadcast may differ to a version of the program as recorded on to a digital versatile disc. For this reason a set of UMID's for each version may differ as a result of the differing content. Each version of the program may therefore be assigned a different UPID identifying that version of the program. Therefore at the emission stage 44 an update of the asset management system 1 is effected as represented by the further arrow 46 so that the final UPID to UMID association is recorded for each emitted version of the program.

A clockwise broken arrow 48 represents the emission of the audio/video program to consumers. At a consumption stage 50 consumers are watching/listening to the audio/video production. At this stage however marketing information is gathered by monitoring the number of consumers which are listening and/or watching the audio/video program, when the program is broadcast, or monitoring the sales of the distributed program through pay-per-view, or sales of, for example, digital versatile discs. For the example in which the program is broadcast, the proportion of consumers viewing/listening the program might be gathered for example via a set top box. Typically such set top boxes are provided with a telephone line which is communicated to a marketing centre which monitors which programs are being watched by a selected sample of consumers from which marketing information and analysis is formed. This marketing information and analysis is acquired as represented by a clockwise broken arrow 52 to produce a relative proportion of a possible population viewing the audio/video program with respect to time to the effect that individual items of audio/video material associated with UMIDs may be evaluated as to the relative audience detected at the time of broadcast. The marketing information provided at an analysis stage 54 is then also fed to the asset management system 1 and associated with the corresponding UPID for the program. This information is stored in the consumer analysis data base 8. At the analysis stage 54 the program identifier is associated with the UPID and forwarded to the asset management system 1 via the connecting arrow 56.

The transport program identifier in combination with the time of emission is mapped to UPID within the database 8. The database 8, may therefore include a table matching the transport program identifiers 54 with the time of emission. With this information the corresponding UPID is added to the table, providing a match between UPID and program ID/time of emission. As such the time of day of consumer analysis at stage 50 is logged with respect to the time of emission at stage 44, providing a match between the emission process 48 and the analysis process 54. In further embodiments of the invention, the UPIDs and/or UMIDs may be converged. Furthermore, the UMID may be used to form a watermark within the audio/video program.

The integrated system as represented in FIG. 16 is provided with a particular advantage in that the viewing figures generated at the analysis stage 54 are fed back and associated with the UPID and with individual UMIDs associated with the audio/video material within the program. As such at a future planning and conception stage 10 for subsequent audio/video programs, the producers of the new program may interrogate the asset management system 1 and receive not only the production plans for the earlier program but the viewing figures and analysis of consumer rating for the program and parts of the program. Each new audio/video program serves to further enrich the asset management system 1 from which future productions of programs may benefit. This benefit is therefore represented in FIG. 16 by a connecting arrow 60. In effect, therefore the integrated system shown in FIG. 16 provides a means for identifying all audio/video material associated with each audio/video program produced.

Two example applications of this identification and tracking of audio/video material will now be explained. As will be appreciated the copyright of the audio/video program will be owned by the producers of that program. However the copyright of individual items of audio/video material may not belong to the producers. Through the integrated system of FIG. 16, each item of audio/video material is associated with a UMID. As such the asset management system 1 is provided with the database 6 in which the copyright owner of the audio/video material is stored with its corresponding UMID. As a result after the program has been packaged at stage 38 and emitted at stage 44, a list of license requirements for audio/video material not owned by the production company can be generated and appropriate royalties calculated. The royalties may be calculated from a business management software application forming part of the asset management system 1. Furthermore because the integrated system provides a measure of the audience for each individual item of audio/video material, the licensing royalties may be established as a function of the relative audience for those parts of audio/video material.

A further example application of the audio/video material identification and tracking facility provided by the integrated system shown in FIG. 16 is for billing. This is because, as explained above, different media may be used to represent the same program and as such the program may differ to some extent between different media. As a result at the emission stage 44 the augmented content of each of the versions of the program on different media is analysed. This might be for example to identify product placement and sponsorship items which may be different between the different versions of the program identified. The UMIDs associated with this audio/video material can then be fed to a database. Such a database may be the database 8 of the asset management system 1. Therefore from the different items of audio/video material produced for the different versions of the program, a bill may be automatically generated in accordance with sponsorship and produce placement deals. This may be similarly effected using a business management application program forming part of the asset management system 1.

It will be appreciated from the foregoing description that one of the advantages of the integrated system shown in FIG. 16 is that audio/video productions can utilise planning and concept information of previous audio/video productions. Furthermore audio/video productions can also benefit from marketing information providing a relative measure of consumer demand for previous audio/video productions and parts of the productions. As subsequent audio/video productions generate further planning information, and market analysis information, which is fed back and incorporated into the asset management system 1, the asset management system 1 is further enriched to the benefit of further productions. The term emitted will be used to described the distribution of the audio/video program on any medium, which includes terrestrial and satellite broadcast, as will as sale on video tape and digital versatile disc.

Acquisition Unit

Embodiments of the present invention relate to audio and/or video generation apparatus which may be for example television cameras, video cameras or camcorders. An embodiment of the present invention will now be described with reference to FIG. 1 which provides a schematic block diagram of a video camera which is arranged to communicate to a personal digital assistant (PDA). A PDA is an example of a data processor which may be arranged in operation to generate metadata in accordance with a user's requirements. The term personal digital assistant is known to those acquainted with the technical field of consumer electronics as a portable or hand held personal organiser or data processor which include an alpha numeric key pad and a hand writing interface.

Figure 1:
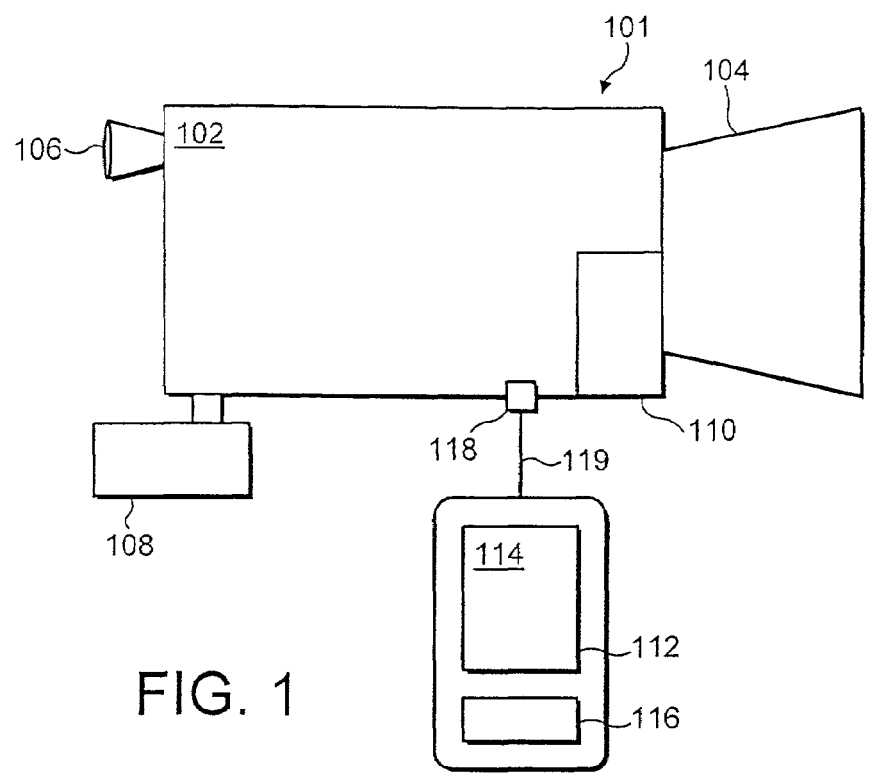
FIG. 1 is a schematic block diagram of a video camera arranged in operative association with a Personal Digital Assistant (PDA)

In FIG. 1 a video camera 101 is shown to comprise a camera body 102 which is arranged to receive light from an image source falling within a field of view of an imaging arrangement 104 which may include one or more imaging lenses (not shown). The camera also includes a view finder 106 and an operating control unit 108 from which a user can control the recording of signals representative of the images formed within the field of view of the camera. The camera 101 also includes a microphone 110 which may be a plurality of microphones arranged to record sound in stereo. Also shown in FIG. 1 is a hand-held PDA 112 which has a screen 114 and an alphanumeric key pad 116 which also includes a portion to allow the user to write characters recognised by the PDA. The PDA 112 is arranged to be connected to the video camera 101 via an interface 118. The interface 118 is arranged in accordance with a predetermined standard format such as, for example an RS232 or the like. The interface 118 may also be effected using infra-red signals, whereby the interface 118 is a wireless communications link. The interface 118 provides a facility for communicating information with the video camera 101. The function and purpose of the PDA 112 will be explained in more detail shortly. However in general the PDA 112 provides a facility for sending and receiving metadata generated using the PDA 112 and which can be recorded with the audio and video signals detected and captured by the video camera 1. A better understanding of the operation of the video camera 101 in combination with the PDA 112 may be gathered from FIG. 2 which shows a more detailed representation of the body 102 of the video camera which is shown in FIG. 1 and in which common parts have the same numerical designations.

Figure 2:
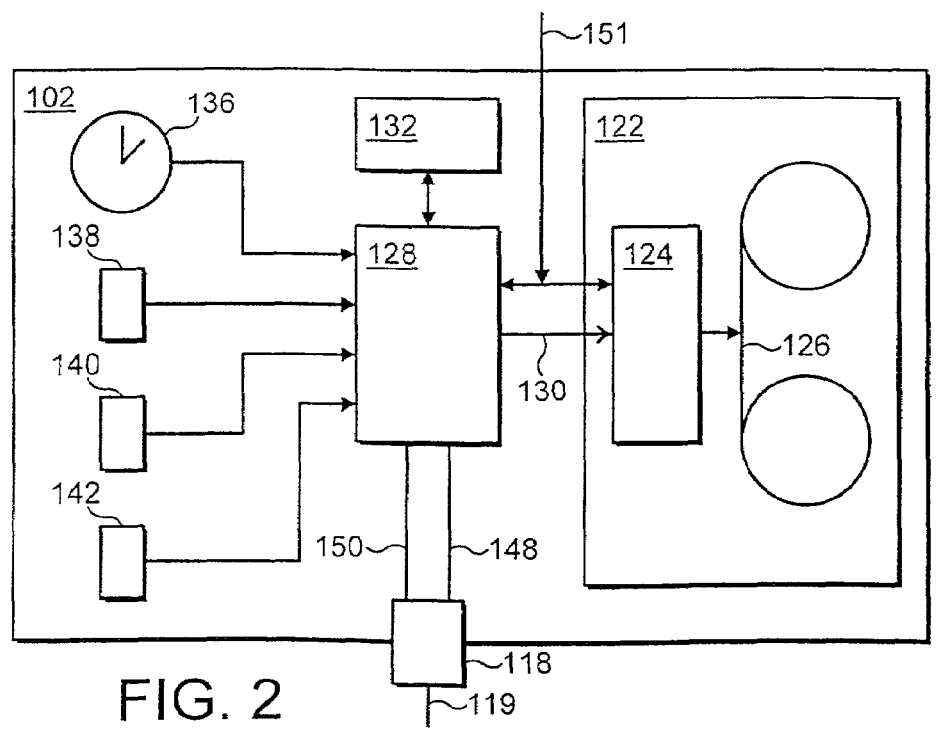
FIG. 2 is a schematic block diagram of parts of the video camera shown in FIG. 1.

In FIG. 2 the camera body 102 is shown to comprise a tape drive 122 having read/write heads 124 operatively associated with a magnetic recording tape 126. Also shown in FIG. 2 the camera body includes a metadata generation processor 128 coupled to the tape drive 122 via a connecting channel 130. Also connected to the metadata generation processor 128 is a data store 132, a clock 136 and three sensors 138, 140, 142. The interface unit 118 sends and receives data also shown in FIG. 2 via a wireless channel 119. Correspondingly two connecting channels for receiving and transmitting data respectively, connect the interface unit 118 to the metadata generation processor 128 via corresponding connecting channels 148 and 150. The metadata generation processor is also shown to receive via a connecting channel 151 the audio/video signals generated by the camera. The audio/video signals are also fed to the tape drive 122 to be recorded on to the tape 126.

The video camera 110 shown in FIG. 1 operates to record visual information falling within the field of view of the lens arrangement 104 onto a recording medium. The visual information is converted by the camera into video signals. In combination, the visual images are recorded as video signals with accompanying sound which is detected by the microphone 101 and arranged to be recorded as audio signals on the recording medium with the video signals. As shown in FIG. 2, the recording medium is a magnetic tape 126 which is arranged to record the audio and video signals onto the recording tape 126 by the read/write heads 124. The arrangement by which the video signals and the audio signals are recorded by the read/write heads 124 onto the magnetic tape 126 is not shown in FIG. 2 and will not be further described as this does not provide any greater illustration of the example embodiment of the present invention. However once a user has captured visual images and recorded these images using the magnetic tape 126 as with the accompanying audio signals, metadata describing the content of the audio/video signals may be input using the PDA 112. As will be explained shortly this metadata can be information that identifies the audio/video signals in association with a pre-planned event, such as a 'take'. As shown in FIG. 2 the interface unit 118 provides a facility whereby the metadata added by the user using the PDA 112 may be received within the camera body 102. Data signals may be received via the wireless channel 119 at the interface unit 118. The interface unit 118 serves to convert these signals into a form in which they can be processed by the acquisition processor 128 which receives these data signals via the connecting channels 148, 150.

Metadata is generated automatically by the metadata generation processor 128 in association with the audio/video signals which are received via the connecting channel 151. In the example embodiment illustrated in FIG. 2, the metadata generation processor 128 operates to generate time codes with reference to the clock 136, and to write these time codes on to the tape 126 in a linear recording track provided for this purpose. The time codes are formed by the metadata generation processor 128 from the clock 136. Furthermore, the metadata generation processor 128 forms other metadata automatically such as a UMID, which identifies uniquely the audio/video signals. The metadata generation processor may operate in combination with the tape driver 124, to write the UMID on to the tape with the audio/video signals.

In an alternative embodiment, the UMID, as well as other metadata may be stored in the data store 132 and communicated separately from the tape 126. In this case, a tape ID is generated by the metadata generation processor 128 and written on to the tape 126, to identify the tape 126 from other tapes.

In order to generate the UMID, and other metadata identifying the contents of the audio/video signals, the metadata generation processor 128 is arranged in operation to receive signals from other sensor 138, 140, 142, as well as the clock 136. The metadata generation processor therefore operates to co-ordinate these signals and provides the metadata generation processor with metadata such as the aperture setting of the camera lens 104, the shutter speed and a signal received via the control unit 108 to indicate that the visual images captured are a "good shot". These signals and data are generated by the sensors 138, 140, 142 and received at the metadata generation processor 128. The metadata generation processor in the example embodiment is arranged to produce syntactic metadata which provides operating parameters which are used by the camera in generating the video signals. Furthermore the metadata generation processor 128 monitors the status of the camcorder 101, and in particular whether audio/video signals are being recorded by the tape drive 124. When RECORD START is detected the IN POINT time code is captured and a UMID is generated in correspondence with the IN POINT time code. Furthermore in some embodiments an extended UMID is generated, in which case the metadata generation processor is arranged to receive spatial co-ordinates which are representative of the location at which the audio/video signals are acquired. The spatial co-ordinates may be generated by a receiver which operates in accordance with the Global Positioning System (GPS). The receiver may be external to the camera, or may be embodied within the camera body 102.

When RECORD START is detected, the OUT POINT time code is captured by the metadata generation processor 128. As explained above, it is possible to generate a "good shot" marker. The "good shot" marker is generated during the recording process, and detected by the metadata generation processor. The "good shot" marker is then either stored on the tape, or within the data store 132, with the corresponding IN POINT and OUT POINT time codes.

As already indicated above, the PDA 112 is used to facilitate identification of the audio/video material generated by the camera. To this end, the PDA is arranged to associate this audio/video material with pre-planned events such as scenes, shots or takes. The camera and PDA shown in FIGS. 1 and 2 form part of an integrated system for planning, acquiring, editing an audio/video production. During a planning phase, the scenes which are required in order to produce an audio/ video production are identified. Furthermore for each scene a number of shots are identified which are required in order to establish the scene. Within each shot, a number of takes may be generated and from these takes a selected number may be used to form the shot for the final edit. The planning information in this form is therefore identified at a planning stage. Data representing or identifying each of the planned scenes and shots is therefore loaded into the PDA 112 along with notes which will assist the director when the audio/video material is captured. An example of such data is shown in the table below.

| A/V Production | News story: BMW disposes of Rover |
|---|---|
| Scene ID: 900015689 | Outside Longbride |
| Shot 5000000199 | Longbridge BMW Sign |
| Shot 5000000200 | Workers Leaving shift |
| Shot 5000000201 | Workers in car park |
| Scene ID: 900015690 | BMW HQ Munich |
| Shot 5000000202 | Press conference |
| Shot 5000000203 | Outside BMW building |
| Scene ID: 900015691 | Interview with minister |
| Shot 5000000204 | Interview |

Figure 3:
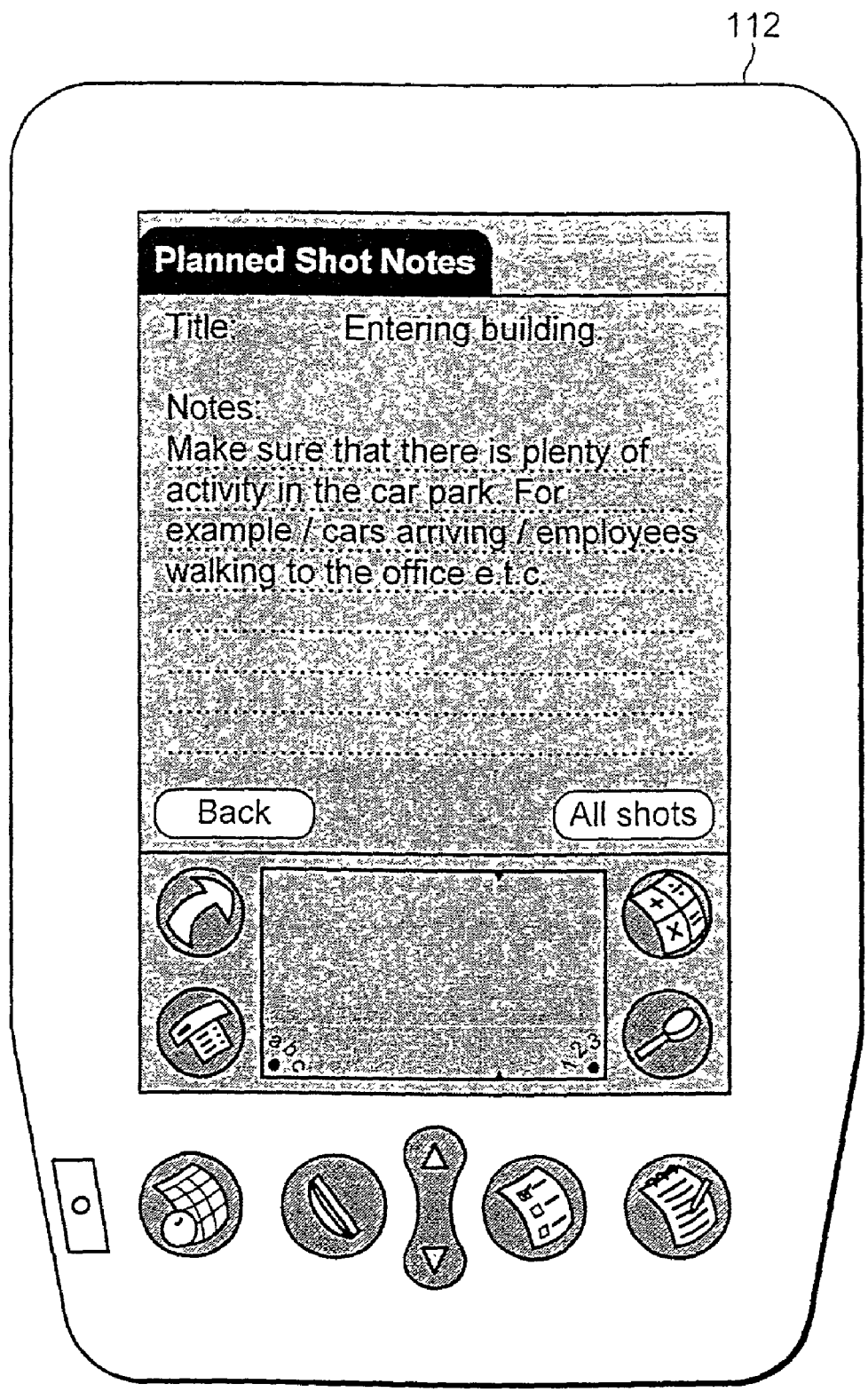
FIG. 3 is a pictorial representation providing an example of the form of the PDA shown in FIG. 1.

In the first column of the table below the event which will be captured by the camera and for which audio/video material will be generated is shown. Each of the events which is defined in a hierarchy is provided with an identification number. Correspondingly, in the second column notes are provided in order to direct or remind the director of the content of the planned shot or scene. For example, in the first row the audio/video production is identified as being a news story, reporting the disposal of Rover by BMW. In the extract of the planning information shown in the table below, there are three scenes, each of which is provided with a unique identification number. Each of these scenes are "Outside Long Bridge", "BMW HQ Munich" and "Interview with Minister". Correspondingly for each scene a number of shots are identified and these are shown below each of the scenes with a unique shot identification number. Notes corresponding to the content of each of these shots are also entered in the second column. So, for example, for the first scene "Outside Long Bridge", three shots are identified which are "Long Bridge BMW", "Workers leaving shift" and "Workers in car park". With this information loaded onto the PDA, the director or indeed a single camera man may take the PDA out to the place where the new story is to be shot, so that the planned audio/video material can be gathered. An illustration of the form of the PDA with the graphical user interface displaying this information is shown in FIG. 3.

As indicated in FIG. 1, the PDA 112 is arranged to communicate data to the camera 111. To this end the metadata generation processor 128 is arranged to communicate data with the PDA 112 via the interface 118. The interface 118 maybe for example an infra-red link 119 providing wireless communications in accordance with a known standard. The PDA and the parts of the camera associated with generating metadata which are shown in FIG. 2 are shown in more detail in FIG. 4.

Figure 4:
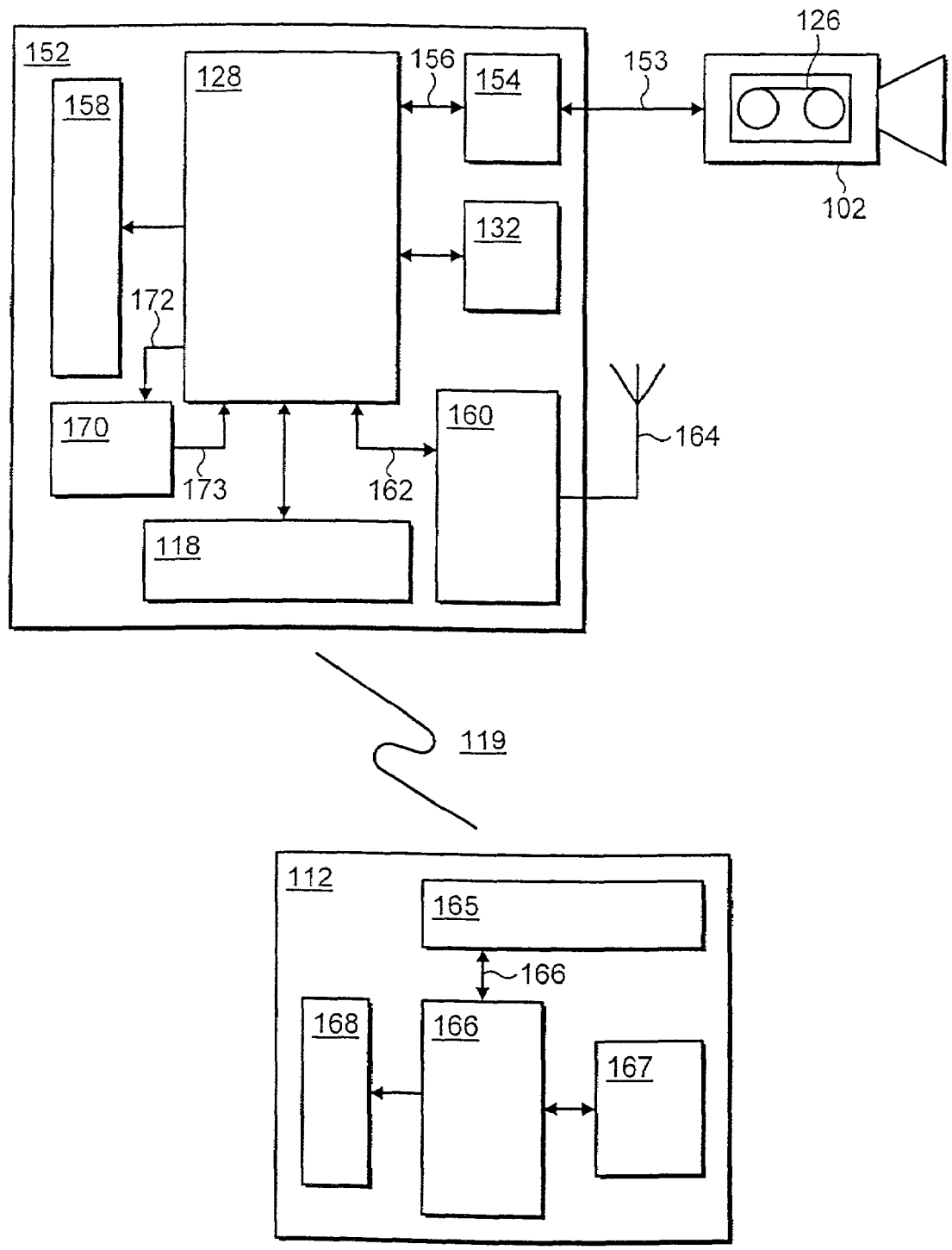
FIG. 4 is a schematic block diagram of a further example arrangement of parts of a video camera and some of the parts of the video camera associated with generating and processing meta data as a separate acquisition unit associated with a further example PDA.

In FIG. 4 the parts of the camera which are associated with generating metadata and communicating with the PDA 112 are shown in a separate acquisition unit 152. However it will be appreciated that the acquisition unit 152 could also be embodied within the camera 102. The acquisition unit 152 comprises the metadata generation processor 128, and the data store 132. The acquisition processor 152 also includes the clock 136 and the sensors 138, 140, 142 although for clarity these are not shown in FIG. 4. Alternatively, some or all of these features which are shown in FIG. 2 will be embodied within the camera 102 and the signals which are required to define the metadata such as the time codes and the audio/video signals themselves may be communicated via a communications link 153 which is coupled to an interface port 154. The metadata generation processor 128 is therefore provided with access to the time codes and the audio/video material as well as other parameters used in generating the audio/video material. Signals representing the time codes end parameters as well as the audio/video signals are received from the interface port 154 via the interface channel 156. The acquisition unit 152 is also provided with a screen (not shown) which is driven by a screen driver 158. Also shown in FIG. 4 the acquisition unit is provided with a communications processor 160 which is coupled to the metadata generation processor 128 via a connecting channel 162. Communications is effected by the communications processor 160 via a radio frequency communications channel using the antennae 164. A pictorial representation of the acquisition unit 152 is shown in FIG. 5.

The PDA 112 is also shown in FIG. 4. The PDA 112 is correspondingly provided with an infra-red communications port 165 for communicating data to and from the acquisition unit 152 via an infra-red link 119. A data processor 166 within the PDA 112 is arranged to communicate data to and from the infra-red port 165 via a connecting channel 166. The PDA 112 is also provided with a data store 167 and a screen driver 168 which are connected to the data processor 166.

Figure 5:
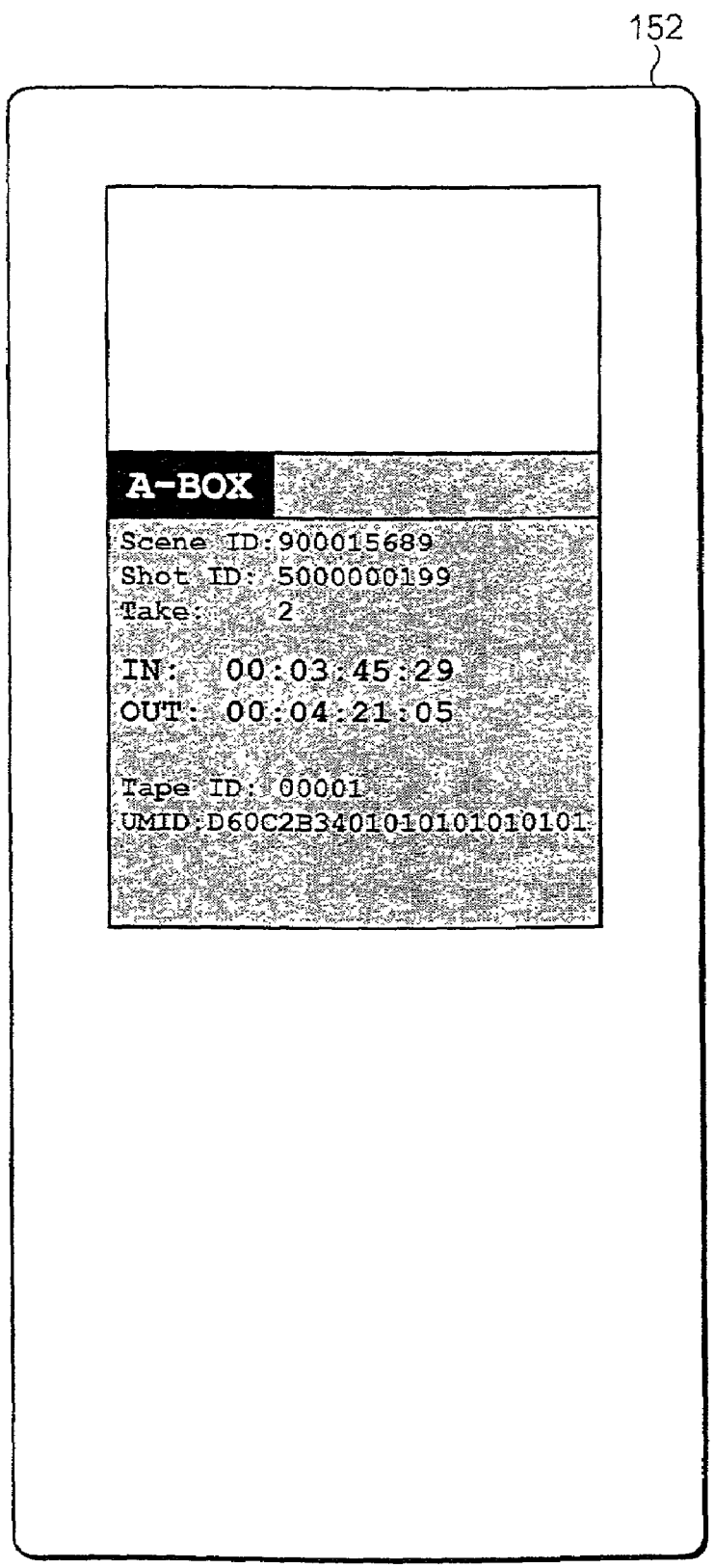
FIG. 5 is a pictorial representation providing an example of the form of the acquisition unit shown in FIG. 4.
Figure 6:
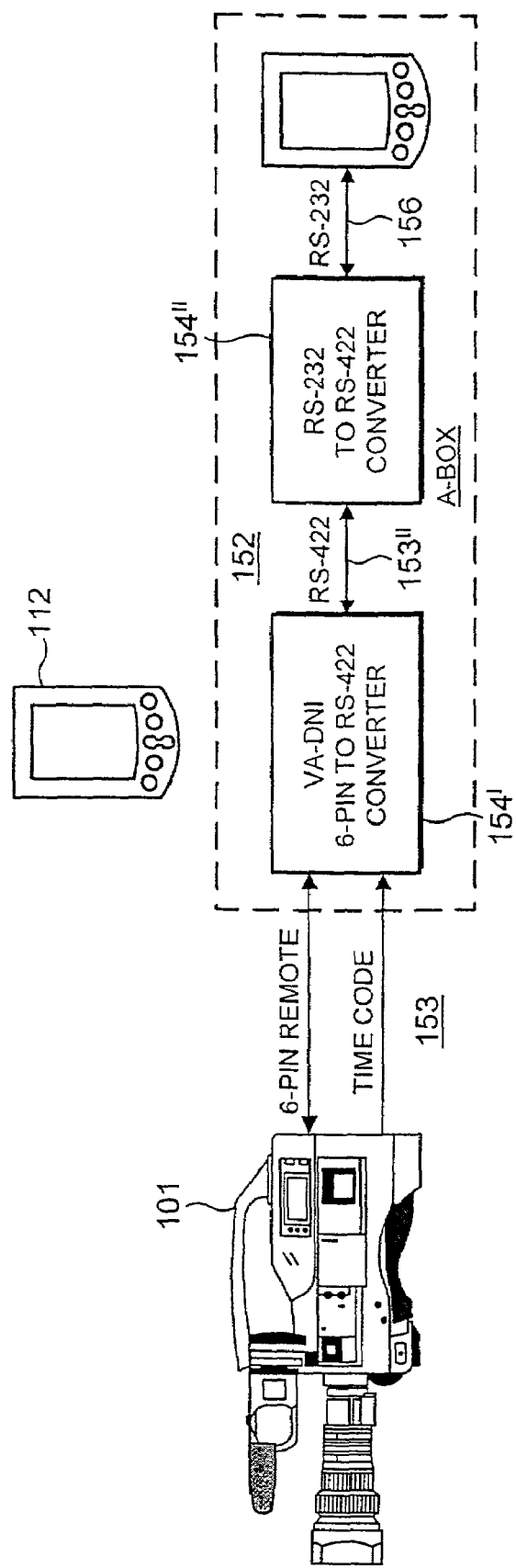
FIG. 6 is a part schematic part pictorial representation illustrating an example of the connection between the acquisition unit and the video camera of FIG. 4.

The pictorial representation of the PDA 112 shown in FIG. 3 and the acquisition unit shown in FIG. 5 provide an illustration of an example embodiment of the present invention. A schematic diagram illustrating the arrangement and connection of the PDA 112 and the acquisition unit 152 is shown in FIG. 6. In the example shown in FIG. 6 the acquisition unit 152 is mounted on the back of a camera 101 and coupled to the camera via a six pin remote connector and to a connecting channel conveying the external signal representative of the time code recorded onto the recording tape. Thus, the six pin remote connector and the time code indicated as arrow lines form the communications channel 153 shown in FIG. 4. The interface port 154 is shown in FIG. 6 to be a VA to DN1 conversion comprising an RM-P9/LTC to RS422 converter 154. RM-P9 is a camera remote control protocol, whereas LTC is Linear Time Code in the form of an analogue signal. This is arranged to communicate with a RS422 to RS232 converter 154" via a connecting channel which forms part of the interface port 154. The converter 154" then communicates with the metadata generation processor 128 via the connecting channel 156 which operates in accordance with the RS 232 standard.

Returning to FIG. 4, the PDA 112 which has been loaded with the pre-planned production information is arranged to communicate the current scene and shot for which audio/video material is to be generated by communicating the next shot ID number via the infra-red link 119. The pre-planned information may also have been communicated to the acquisition unit 152 and stored in the data store 132 via a separate link or via the infra-red communication link 119. However in effect the acquisition unit 152 is directed to generate metadata in association with the scene or shot ID number which is currently being taken. After receiving the information of the current shot the camera 102 is then operated to make a "take of the shot". The audio/video material of the take is recorded onto the recording tape 126 with corresponding time codes. These time codes are received along with the audio/video material via the interface port 154 at the metadata generation processor 128. The metadata generation processor 128 having been informed of the current pre-planned shot now being taken logs the time codes for each take of the shot. The metadata generation processor therefore logs the IN and OUT time codes of each take and stores these in the data store 132.

The information generated and logged by the metadata generation processor 128 is shown in the table below. In the first column the scene and shot are identified with the corresponding ID numbers, and for each shot several takes are made by the camera operator which are indicated in a hierarchical fashion. Thus, having received information from the PDA 112 of the current shot, each take made by the camera operator is logged by the metadata generation processor 128 and the IN and OUT points for this take are shown in the second and third columns and stored in the data store 132. This information may also be displayed on the screen of the acquisition unit 152 as shown in FIG. 5. Furthermore, the metadata generation processor 128 as already explained generates the UMID for each take for the audio/video material generated during the take. The UMID for each take forms the fourth column of the table. Additionally, in some embodiments, to provide a unique identification of the tape once which the material is recorded, a tape identification is generated and associated with the metadata. The tape identification may be written on to the tape, or stored on a random access memory chip which is embodied within the video tape cassette body. This random access memory chip is known as a TELEFILE (RTM) system which provides a facility for reading the tape ID number remotely. The tape ID is written onto the magnetic tape 126 to uniquely identify this tape. In preferred embodiments the TELEFILE (RTM) system is provided with a unique number which manufactured as part of the memory and so can be used as the tape ID number. In other embodiments the TELEFILE (RTM) system provides automatically the IN/OUT time codes of the recorded audio/video material items.

In one embodiment the information shown in the table below is arranged to be recorded onto the magnetic tape in a separate recording channel. However, in other embodiments the metadata shown in the table is communicated separately from the tape 126 using either the communications processor 160 or the infra-red link 119. The metadata maybe received by the PDA 112 for analysis and may be further communicated by the PDA.

| Scene ID: 900015689 | Tape ID: 00001 | | UMID: |
|---|---|---|---|
| Shot 5000000199 | | | |
| Take 1 | IN: 00:03:45:29 | OUT: 00:04:21:05 | 060C23B340... |
| Take 2 | IN: 00:04:21:20 | OUT: 00:04:28:15 | 060C23B340... |
| Take 3 | IN: 00:04:28:20 | OUT: 00:05:44:05 | 060C23B340... |
| Shot 5000000200 | | | |
| Take 1 | IN: 00:05:44:10 | OUT: 00:08:22:05 | 060C23B340... |
| Take 2 | IN: 00:08:22:10 | OUT: 00:08:23:05 | 060C23B340... |

The communications processor 160 may be arranged in operation to transmit the metadata generated by the metadata generation processor 128 via a wireless communications link. The metadata maybe received via the wireless communications link by a remotely located studio which can then acquire the metadata and process this metadata ahead of the audio/video material recorded onto the magnetic tape 126. This provides an advantage in improving the rate at which the audio/video production may be generated during the post production phase in which the material is edited.

A further advantageous feature provided by embodiments of the present invention is an arrangement in which a picture stamp is generated at certain temporal positions within the recorded audio/video signals. A picture stamp is known to those skilled in the art as being a digital representation of an image and in the present example embodiment is generated from the moving video material generated by the camera. The picture stamp may be of lower quality in order to reduce an amount of data required to represent the image from the video signals. Therefore the picture stamp may be compression encoded which may result in a reduction in quality. However a picture stamp provides a visual indication of the content of the audio/video material and therefore is a valuable item of metadata. Thus, the picture stamp may for example be generated at the IN and OUT time codes of a particular take. Thus, the picture stamps may be associated with the metadata generated by the metadata generation processor 128 and stored in the data store 132. The picture stamps are therefore associated with items of metadata such as, for example, the time codes which identify the place on the tape where the image represented by the picture stamp is recorded. The picture stamps may be generated with the "Good Shot" markers. The picture stamps are generated by the metadata generation processor 128 from the audio/video signals received via the communications link 153. The metadata generation processor therefore operates to effect a data sampling and compression encoding process in order to produce the picture stamps. Once the picture stamps have been generated they can be used for several purposes. They may be stored in a data file and communicated separately from the tape 126, or they may be stored on the tape 126 in compressed form in a separate recording channel. Alternatively in preferred embodiments picture stamps may be communicated using the communications processor 160 to the remotely located studio where a producer may analysis the picture stamps. This provides the producer with an indication as to whether the audio/video material generated by the camera operator is in accordance with what is required.

In a yet further embodiment, the picture stamps are communicated to the PDA 112 and displayed on the PDA screen. This may be effected via the infra-red port 119 or the PDA may be provided with a further wireless link which can communicate with the communications processor 160. In this way a director having the hand held PDA 112 is provided with an indication of the current audio/video content generated by the camera. This provides an immediate indication of the artist and aesthetic quality of the audio/video material currently being generated. As already explained the picture stamps are compression encoded so that they may be rapidly communicated to the PDA.

A further advantage of the acquisition unit 152 shown in FIG. 4 is that the editing process is made more efficient by providing the editor at a remotely located studio with an indication of the content of the audio/video material in advance of receiving that material. This is because the picture stamps are communication with the metadata via a wireless link so that the editor is provided with an indication of the content of the audio/video material in advance of receiving the audio/video material itself. In this way the bandwidth of the audio/video material can remain high with a correspondingly high quality whilst the metadata and picture stamps are at a relatively low band width providing relatively low quality information. As a result of the low band width the metadata and picture stamps may be communicated via a wireless link on a considerably lower band width channel. This facilitates rapid communication of the metadata describing content of the audio/video material.

The picture stamps generated by the metadata generation processor 128 can be at any point during the recorded audio/video material. In one embodiment the picture stamps are generated at the IN and OUT points of each take. However in other embodiments of the present invention as an activity processor 170 is arranged to detect relative activity within the video material. This is effected by performing a process in which a histogram of the colour components of the images represented by the video signal is compiled and the rate of change of the colour components determined and changes in these colour components used to indicate activity within the image. Alternatively or in addition, motion vectors within the image are used to indicate activity. The activity processor 176 then operates to generate a signal indicative of the relative activity within the video material. The metadata generation processor 128 then operates in response to the activity signal to generate picture stamps such more picture stamps are generated for greater activity within the images represented by the video signals.

In an alternative embodiment of the present invention the activity processor 170 is arranged to receive the audio signals via the connecting channel 172 and to recognise speech within the audio signals. The activity processor 170 then generates content data representative of the content of this speech as text. The text data is then communicated to the data processor 128 which may be stored in the data store 132 or communicated with other metadata via the communications processor 160 in a similar way to that already explained for the picture stamps.

Figure 7:
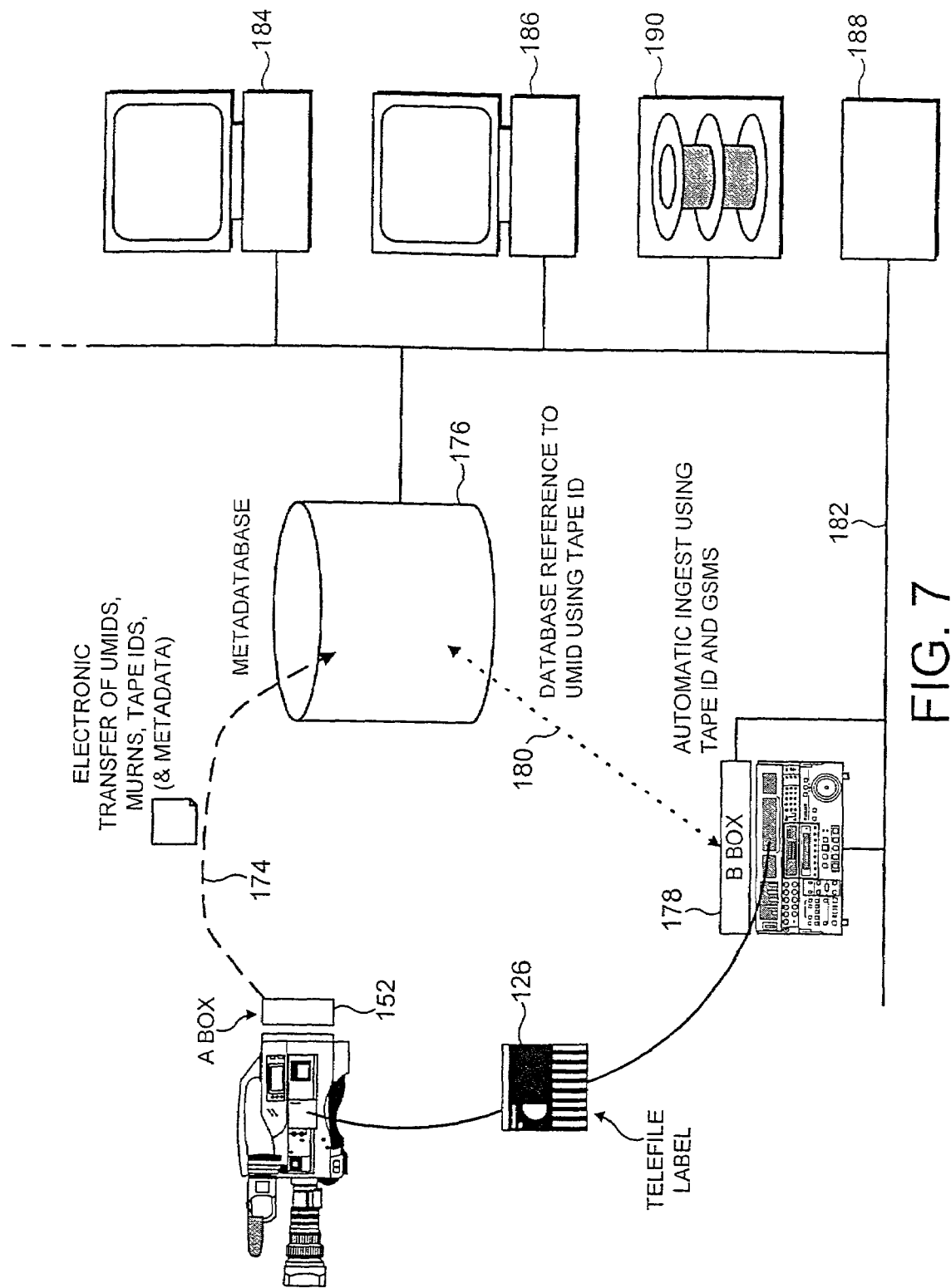
FIG. 7 is a part schematic block diagram of an ingestion processor coupled to a network, part flow diagram illustrating the ingestion of meta data and audio/video material items.

FIG. 7 provides a schematic representation of a post production process in which the audio/video material is edited to produce an audio/video program. As shown in FIG. 7 the metadata, which may include picture stamps and/or the speech content information is communicated from the acquisition unit 152 via a separate route represented by a broken line 174, to a metadata database 176. The route 174 may be representative of a wireless communications link formed by for example UMTS, GSM or the like.

The database 176 stores metadata to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other metadata providing an indication of the content of the audio/video material is used to associate the metadata stored in the data store 176 with the audio/video material on the tape as indicated by the broken line 180.

As will be appreciated although the example embodiment of the present invention uses a video tape as the recording medium for storing the audio/video signals, it will be understood that alternative recording medium such as magnetic disks and random access memories may also be used.

Ingestion Processor

FIG. 7 provides a schematic representation of a post production process in which the audio/video material is edited to produce an audio/video program. As shown in FIG. 7 the metadata, which may include picture stamps and/or the speech content information is communicated from the acquisition unit 152 via a separate route represented by a broken line 174, to a metadata database 176. The route 174 may be representative of a wireless communications link formed by for example UMTS, GSM or the like.

The database 176 stores metadata to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other metadata providing an indication of the content of the audio/video material is used to associate the metadata stored in the data store 176 with the audio/video material on the tape as indicated by the broken line 180.

The ingestion processor 178 is also shown in FIG. 7 to be connected to a network formed from a communications channel represented by a connecting line 182. The connecting line 182 represents a communications channel for communicating data to items of equipment, which form an inter-connected network. To this end, these items of equipment are provided with a network card which may operate in accordance with a known access technique such as Ethernet, RS422 and the like. Furthermore, as will be explained shortly, the communications network 182 may also provide data communications in accordance with the Serial Digital Interface (SDI) or the Serial Digital Transport Interface (SDTI).

Also shown connected to the communications network 182 is the metadata database 176, and an audio/video server 190, into which the audio/video material is ingested. Furthermore, editing terminals 184, 186 are also connected to the communications channel 182 along with a digital multi-effects processor 188.

The communications network 182 provides access to the audio/video material present on tapes, discs or other recording media which are loaded into the ingestion processor 178.

The metadata database 176 is arranged to receive metadata via the route 174 describing the content of the audio/video material recorded on to the recording media loaded into the ingestion processor 178.

As will be appreciated although in the example embodiment a video tape has been used as the recording medium for storing the audio/video signals, it will be understood that alternative recording media such as magnetic disks and random access memories may also be used, and that video tape is provided as an illustrative example only.

The editing terminals 184, 186 digital multi-effects processor 188 are provided with access to the audio/video material recorded on to the tapes loaded into the ingestion processor 178 and the metadata describing this audio/video material stored in the metadata database 176 via the communications network 182. The operation of the ingestion processor with 178 in combination with the metadata database 176 will now be described in more detail.

Figure 8:
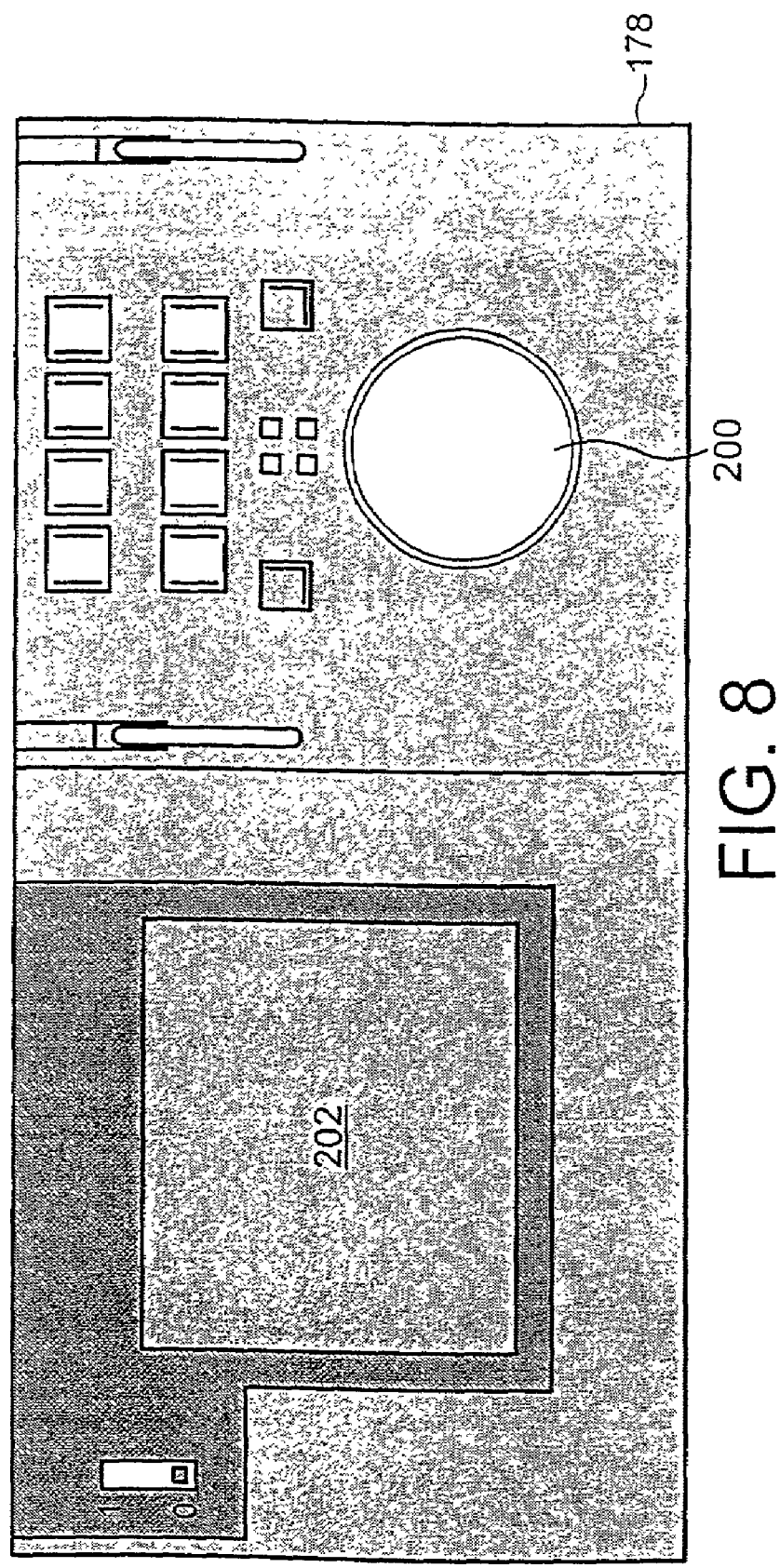
FIG. 8 is a pictorial representation of the ingestion processor shown in FIG. 7.

FIG. 8 provides an example representation of the ingestion processor 178. In FIG. 8 the ingestion processor 178 is shown to have a jog shuttle control 200 for navigating through the audio/video material recorded on the tapes loaded into video tape recorders/reproducers forming part of the ingestion processor 178. The ingestion processor 178 also includes a display screen 202 which is arranged to display picture stamps which describe selected parts of the audio/video material. The display screen 202 also acts as a touch screen providing a user with the facility for selecting the audio/video material by touch. The ingestion processor 178 is also arranged to display all types of metadata on the screen 202 which includes script, camera type, lens types and UMIDs.

Figure 9:
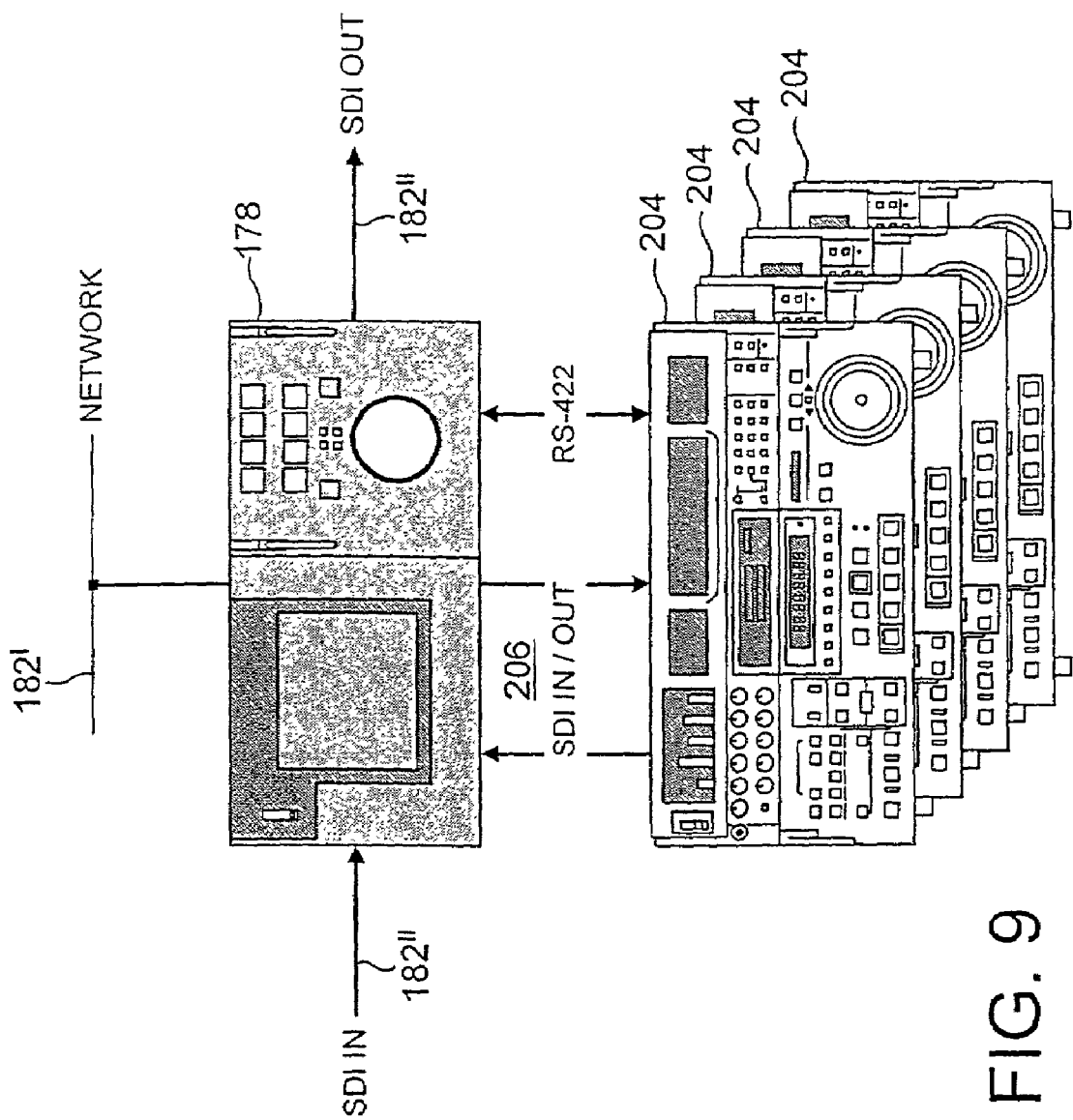
FIG. 9 is a part schematic block diagram part pictorial representation of the ingestion processor shown in FIGS. 7 and 8 shown in more detail.

As shown in FIG. 9, the ingestion processor 178 may include a plurality of video tape recorders/reproducers into which the video tapes onto which the audio/video material is recorded may be loaded in parallel. In the example shown in FIG. 9, the video tape recorders 204 are connected to the ingestion processor 178 via an RS422 link and an SDI IN/OUT link. The ingestion processor 178 therefore represents a data processor which can access any of the video tape recorders 204 in order to reproduce the audio/video material from the video tapes loaded into the video tape recorders. Furthermore, the ingestion processor 178 is provided with a network card in order to access the communications network 182. As will be appreciated from FIG. 9 however, the communications channel 182 is comprised of a relatively low band width data communications channel 182' and a high band width SDI channel 182" for use in streaming video data. Correspondingly, therefore the ingestion processor 178 is connected to the video tape recorders 204 via an RS422 link in order communicate requests for corresponding items of audio/video material. Having requested these items of audio/video material, the audio/video material is communicated back to the ingestion processor 178 via an SDI communication link 206 for distribution via the SDI network. The requests may for example include the UMID which uniquely identifies the audio/video material item(s).

Figure 10:
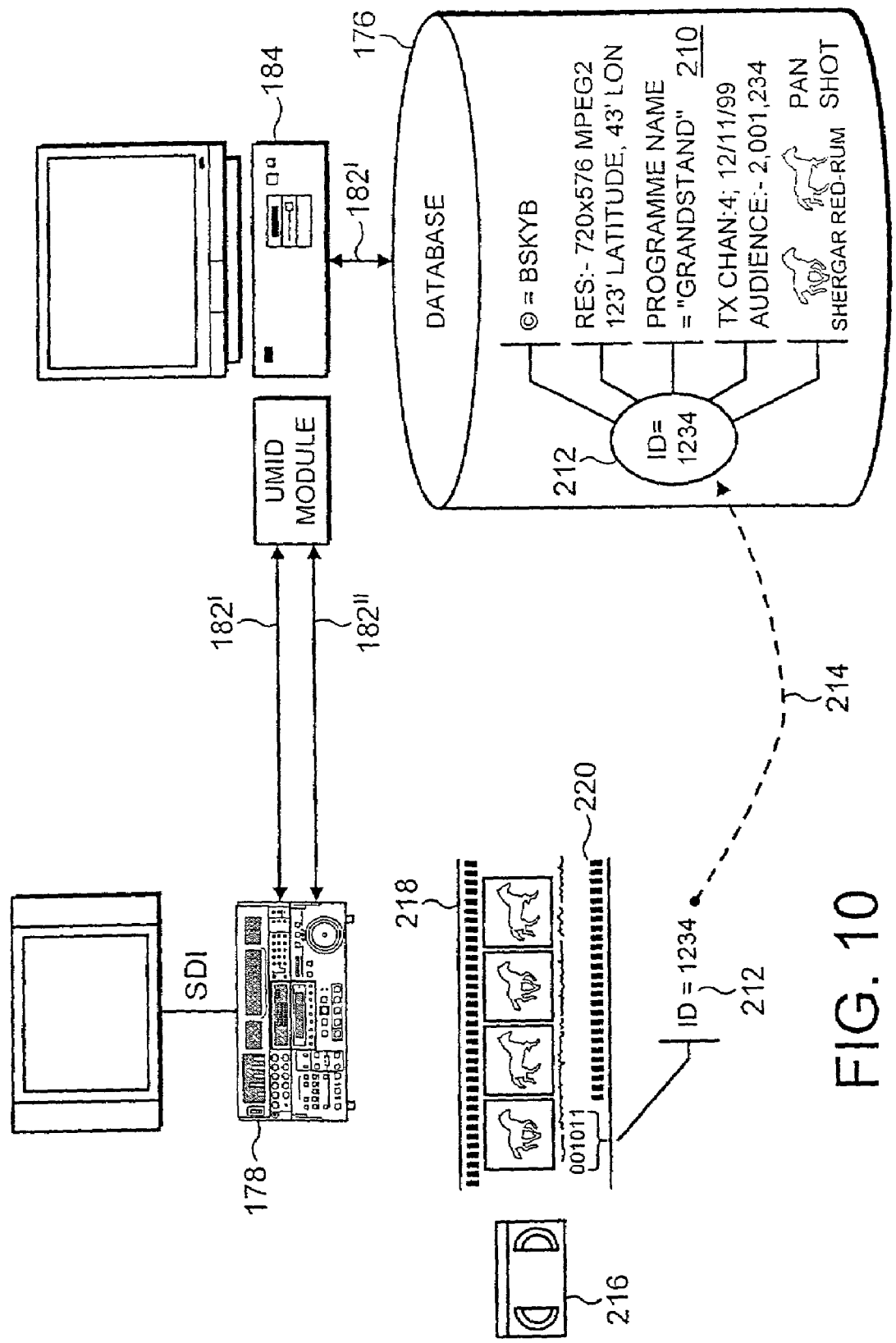
FIG. 10 is a schematic block diagram showing the ingestion processor shown in operative association with the database of FIG. 7.

The operation of the ingestion processor in association with the metadata database 176 will now be explained with reference to FIG. 10. In FIG. 10 the metadata database 176 is shown to include a number of items of metadata 210 associated with a particular tape ID 212. As shown by the broken line headed arrow 214, the tape ID 212 identifies a particular video tape 216, on which the audio/video material corresponding to the metadata 210 is recorded. In the example embodiment shown in FIG. 10, the tape ID 212 is written onto the video tape 218 in the linear time code area 220. However it will be appreciated that in other embodiments, the tape ID could be written in other places such as the vertical blanking portion. The video tape 216 is loaded into one of the video tape recorders 204 forming part of the ingestion processor 178.

In operation one of the editing terminals 184 is arranged to access the metadata database 176 via the low band width communications channel 182' the editing terminal 184 is therefore provided with access to the metadata 210 describing the content of the audio/video material recorded onto the tape 216. The metadata 210 may include such as the copyright owner "BSkyB", the resolution of the picture and the format in which the video material is encoded, the name of the program, which is in this case "Grandstand", and information such as the date, time and audience. Metadata may further include a note of the content of the audio/video material.

Each of the items of audio/video material is associated with a UMID, which identifies the audio/video material. As such, the editing terminal 184 can be used to identify and select from the metadata 210 the items of audio/video material which are required in order to produce a program. This material may be identified by the UMID associated with the material. In order to access the audio/video material to produce the program, the editing terminal 184 communicates a request for this material via the low band width communications network 182. The request includes the UMID or the UMIDs identifying the audio/video material item(s). In response to the request for audio/video material received from the editing terminal 184, the ingestion processor 178 is arranged to reproduce selectively these audio/video material items identified by the UMID or UMIDs from the video tape recorder into which the video cassette 216 is loaded. This audio/video material is then streamed via the SDI network 182" back to the editing terminal 184 to be incorporated into the audio/video production being edited. The streamed audio/video material is ingested into the audio/video server 190 from where the audio/video can be stored and reproduced.

Figure 11:
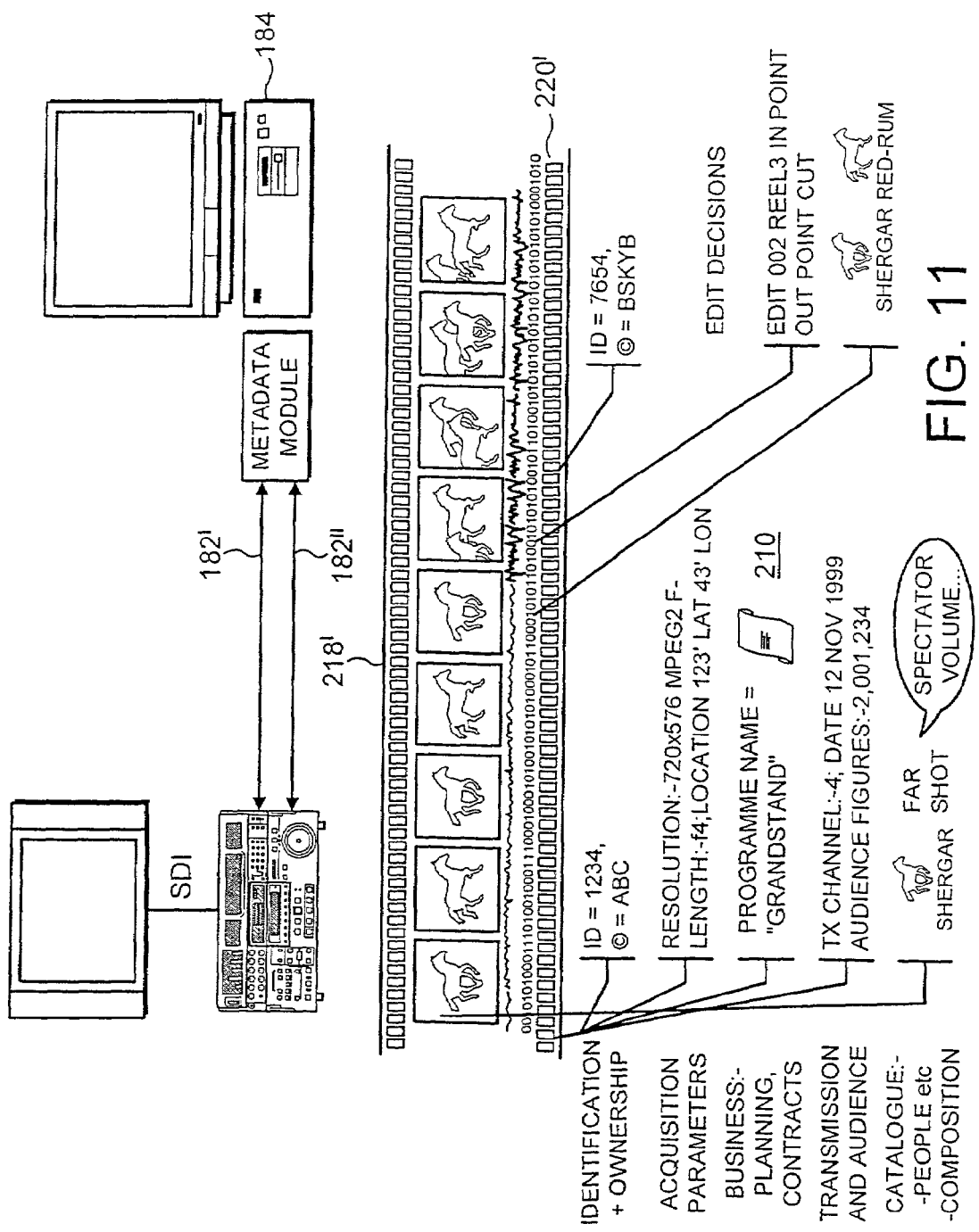
FIG. 11 is a schematic block diagram showing a further example of the operation of the ingestion processor shown FIG. 7.

FIG. 11 provides an alternative arrangement in which the metadata 210 is recorded onto a suitable recording medium with the audio/video material. For example the metadata 210 could be recorded in one of the audio tracks of the video tape 218'. Alternatively, the recording medium may be an optical disc or magnetic disc allowing random access and providing a greater capacity for storing data. In this case the metadata 210 may be stored with the audio/video material.

In a yet further arrangement, some or all of the metadata may be recorded onto the tape 216. This may be recorded, for example, into the linear recording track of the tape 218. Some metadata related to the metadata recorded onto the tape may be conveyed separately and stored in the database 176. A further step is required in order to ingest the metadata and to this end the ingestion processor 178 is arranged to read the metadata from the recording medium 218' and convey the metadata via the communications network 182' to the metadata database 176. Therefore, it will be appreciated that the metadata associated with the audio/video material to be ingested by the ingestion processor 178 may be ingested into the database 176 via a separate medium or via the recording medium on which the audio/video material is also recorded.

The metadata associated with the audio/video material may also include picture stamps which represent low quality representations of the images at various points throughout the video material. These may be presented at the touch screen 202 on the ingestion processor 178. Furthermore these picture stamps may be conveyed via the network 182' to the editing terminals 184, 186 or the effects processor 188 to provide an indication of the content of the audio/video material. The editor is therefore provided with a pictorial representation for the audio/video material and from this a selection of an audio/video material items may be made. Furthermore, the picture stamp may stored in the database 176 as part of the metadata 210. The editor may therefore retrieve a selected item for the corresponding picture stamp using the UMID which is associated with the picture stamp.

In other embodiments of the invention, the recording medium may not have sufficient capacity to include picture stamps recorded with the audio/video material. This is likely to be so if the recording medium is a video tape 216. It is particularly appropriate in this case, although not exclusively so, to generate picture stamps before or during ingestion of the audio/video material.

Returning to FIG. 7, in other embodiments, the ingestion processor 178 may include a pre-processing unit. The pre-processing unit embodied within the ingestion processor 178 is arranged to receive the audio/video material recorded onto the recording medium which, in the present example is a video tape 126. To this end, the pre-processing unit may be provided with a separate video recorder/reproducer or may be combined with the video tape recorder/reproducer which forms part of the ingestion processor 178. The pre-processing unit generates picture stamps associated with the audio/video material. As explained above, the picture stamps are used to provide a pictorial representation of the content of the audio/video material items. However in accordance with a further embodiment of the present invention the pre-processing unit operates to process the audio/video material and generate an activity indicator representative of relative activity within the content of the audio/video material. This may be achieved for example using a processor which operates to generate an activity signal in accordance with a histogram of colour components within the images represented by the video signal and to generate the activity signals in accordance with a rate of change of the colour histogram components. The pre-processing unit then operates to generate a picture stamp at points throughout the video material where there are periods of activity indicated by the activity signal. This is represented in FIG. 12. In FIG. 12A picture stamps 224 are shown to be generated along a line 226 which is representing time within the video signal. As shown in FIG. 12A the picture stamps 224 are generated at times along the time line 226 where the activity signal represented as arrows 228 indicates events of activity. This might be for example someone walking into and out of the field of view of the camera where there is a great deal of motion represented by the video signal. To this end, the activity signal may also be generated using motion vectors which may be, for example, the motion vectors generated in accordance with the MPEG standard.

In other embodiments of the invention, the pre-processor may generate textual information corresponding to speech present within the audio signal forming part of the audio/video material items stored on the tape 126. The textual information may be generated instead of the picture stamps or in addition to the picture stamps. In this case, text may be generated for example for the first words of sentences and/or the first activity of a speaker. This is detected from the audio signals present on the tape recording or forming part of the audio/video material. The start points where text is to be generated is represented along the time line 226 as arrows 230. Alternatively the text could be generated at the end of sentences or indeed at other points of interest within the speech.

At the detected start of the speech, a speech processor operates to generate a textual representation of the content of the speech. To this end, the time line 226 shown in FIG. 12B is shown to include the text 232 corresponding to the content of the speech at the start of activity periods of speech.

The picture stamps and textual representation of the speech activity generated by the pre-processor is communicated via the communications channel 182 to the metadata database 176 and stored. The picture stamps and text are stored in association with the UMID identifying the corresponding items of audio/video material from which the picture stamps 224 and the textual information 232 were generated. This therefore provides a facility to an editor operating one of the editing terminals 184, 186 to analyse the content of the audio/video material before it is ingested using the ingestion processor 178. As such the video tape 126 is loaded into the ingestion processor 178 and thereafter the audio/video material can be accessed via the network communications channel 182. The editor is therefore provided with an indication, very rapidly, of the content of the audio/video material and so may ingest only those parts of the material, which are relevant to the particular material items required by the editor. This has a particular advantage in improving the efficiency with which the editor may produce an audio/video production.

In an alternative embodiment, the pre-processor may be a separate unit and may be provided with a screen on which the picture stamps and/or text information are displayed, and a means such as, for example, a touch screen, to provide a facility for selecting the audio/video material items to be ingested.

In a further embodiment of the invention, the ingestion processor 178 generates metadata items such as UMIDs whilst the audio/video material is being ingested. This may required because the acquisition unit in the camera 152 is not arranged to generate UMIDs, but does generate a Unique Material Reference Number (MURN). The MURN is generated for each material item, such as a take. The MURN is arranged to be considerably shorter than a UMID and can therefore be accommodated within the linear time code of a video tape, which is more difficult for UMIDs because these are larger. Alternatively the MURN may be written into a TELEFILE (RTM) label of the tape. The MURN provides a unique identification of the audio/video material items present on the tape. The MURNs may be communicated separately to the database 176 as indicated by the line 174.

At the ingestion processor 178, the MURN for the material items are recovered from the tape or the TELEFILE label. For each MURN, the ingestion processor 178 operates to generate a UMID corresponding to the MURN. The UMIDs are then communicated with the MURN to the database 176, and are ingested into the database in association with the MURNs, which may be already present within the database 176.

Camera Metadata

The following is provided, by way of example, to illustrate the possible types of metadata generated during the production of a programme, and one possible organisational approach to structuring that metadata.

Figure 13:
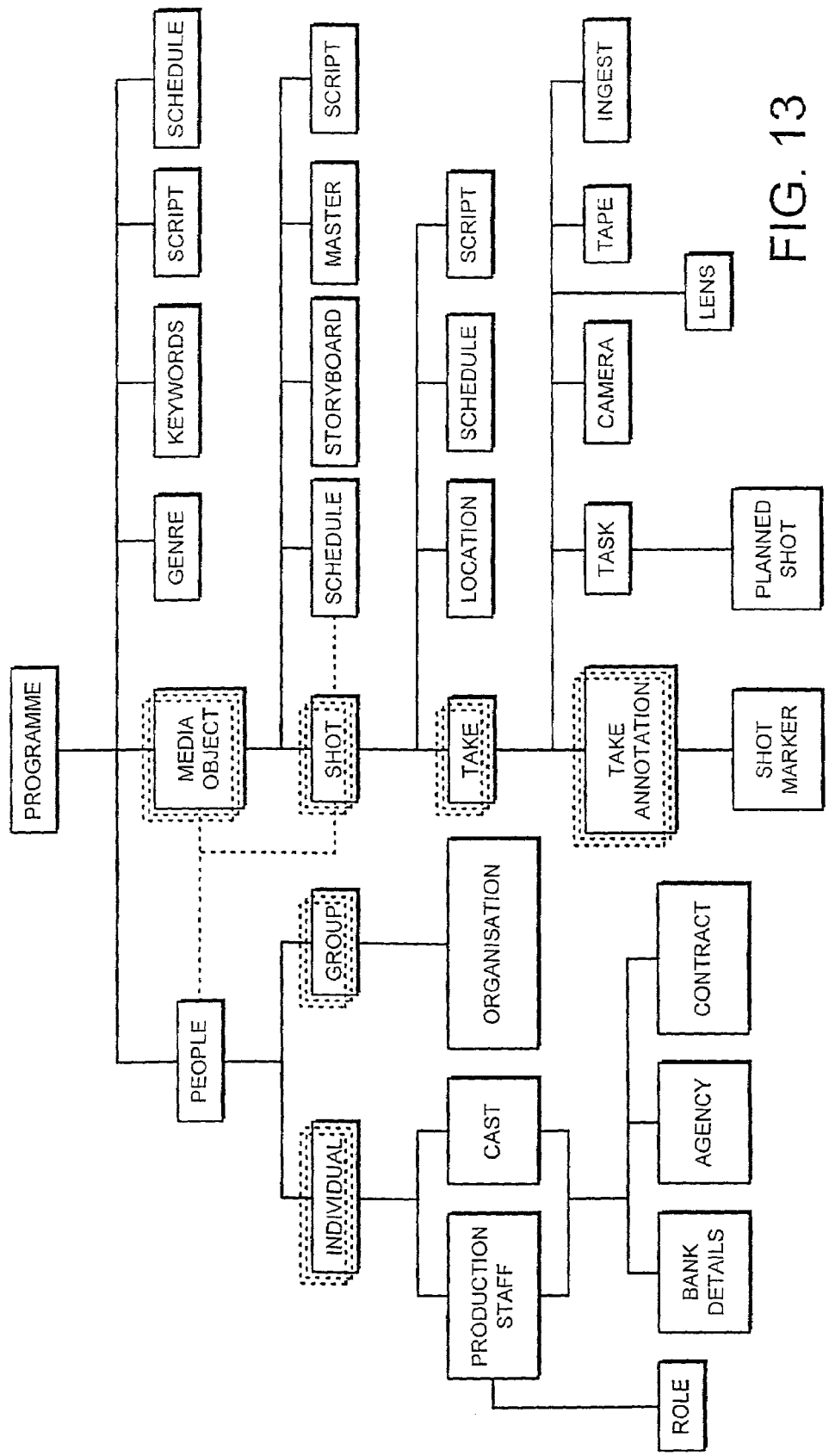

FIG. 13 illustrates an example structure for organising metadata. A number of tables each comprising a number of fields containing metadata are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table. The Programme Table comprises a number of fields including Programme ID (PID), Title, Working Title, Genre ID, Synopsis, Aspect Ratio, Director ID and Picturestamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB, National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picturestamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picturestamp, script ID, schedule ID, and description. Associated with each Shot Table is the People Table, the Schedule Table, script table, a Location Table and a number of Take Tables.

The Location Table comprises a number of fields including Location ID, which is associated with the Location ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Metadata, Tape ID, Camera ID, Head Hours, Videographer, IN Stamp, OUT Stamp. Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

UMID Description

Figure 14:
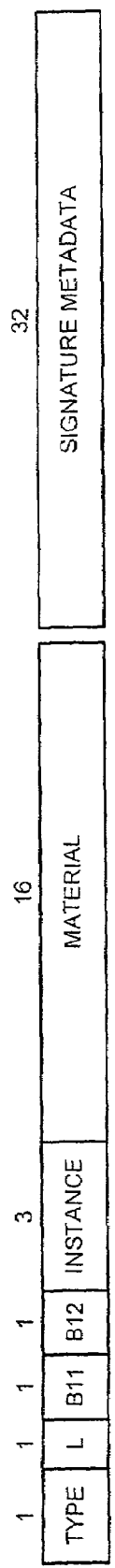
FIG. 14 is a schematic block diagram illustrating the structure of a data reduced UMID.
Figure 15:
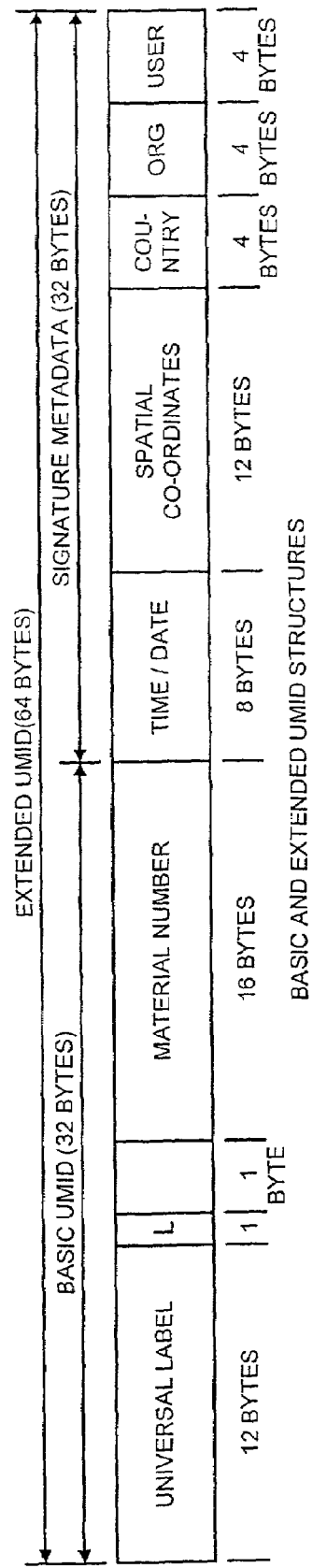
FIG. 15 is a schematic block diagram illustrating the structure of an extended UMID.

A UMID is described in SMPTE Journal March 2000 which provides details of the UMID standard. Referring to FIGS. 14 and 15, a basic and an extended UMID are shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-Byte Universal Label

The first 12 bytes of the UMID provide identification of the UMID by the registered string value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1-12 may have designations other than those shown by way of example in the table. Referring to the Table 1, in the example shown byte 4 indicates that bytes 5-12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed pre-assigned values. Byte 11 is variable. Thus referring to FIG. 15, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number.

Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17 Nov. 1858 and allows dates to the year 4597.

The Spatial Co-Ordinate Format

The spatial co-ordinate value consists of three components defined as follows:

Altitude: 8 decimal numbers specifying up to 99,999,999 meters.
Longitude: 8 decimal numbers specifying East/West 180.00000 degrees (5 decimal places active).
Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

As will be appreciated by those skilled in the art various modifications may be made to the embodiments herein before described without departing from the scope of the present invention. For example whilst embodiments have been described with recording audio/video onto magnetic tape, it will be appreciated that other recording media are possible.

As will be appreciated those features of the invention which appear in the example embodiments as a data processor or processing units could be implemented in hardware as well as a software computer program running on an appropriate data processor. Correspondingly those aspects and features of the invention which are described as computer or application programs running on a data processor may be implemented as dedicated hardware. It will therefore be appreciated that a computer program running on a data processor which serves to form an audio and/or video generation apparatus as herein before described is an aspect of the present invention. Similarly a computer program recorded onto a recordable medium which serves to define the method according to the present invention or when loaded onto a computer forms an apparatus according to the present invention are aspects of the present invention.

Whilst the embodiments described above each include explicitly recited combinations of features according to different aspects of the present invention, other embodiments are envisaged according to the general teaching of the invention, which include combinations of features as appropriate, other than those explicitly recited in the embodiments described above. Accordingly, it will be appreciated that different combinations of features of the appended independent and dependent claims form further aspects of the invention other than those, which are explicitly recited in the claims.

The invention claimed is:

1. A camera configured to generate media data signals, said camera comprising:
   a recording unit configured to record said media data signals on a recording medium,
   a meta data generation processor configured to generate meta data identifying the content of said media data signals in response to said media data signals, and
   a communications processor configured to communicate said meta data separately from said recording medium,
   wherein said meta data generation processor is configured to receive a pre-defined list of takes of media data signals to be generated and to generate said meta data in association with said list of takes, and said communications processor is configured to communicate said meta data in association with said list of takes.

2. The camera as claimed in claim 1, wherein said meta data generated by said meta data generation processor is at least one picture which is representative of an image from said recorded media data signals.

3. The camera as claimed in claim 2, wherein said meta data processor is configured to associate said picture with an address on said recording medium at which said image is recorded, said address forming part of said meta data communicated by said communications processor.

4. The camera as claimed in claim 3, wherein said meta data are in and out points of a take of the media data signals.

5. The camera as claimed in claim 1, wherein said meta data includes a unique identification code for identifying the media data signals.

6. The camera as claimed in claim 5, wherein the unique identification code includes a UMID.

7. A receiving apparatus for receiving and displaying the meta data communicated by the camera as claimed in claim 1.

8. A computer-recordable medium having a computer program recorded thereon, the computer program having computer executable instructions, which when loaded on to a data processor configures said data processor to operate as a camera as claimed in claim 1.

9. The camera according to claim 1, wherein said list of takes includes a list of descriptions of contents describing the media data signals to be recorded.

10. A camera comprising:
    a data storage;
    a meta data generation processor which is configured to receive media data signals, and to generate meta data identifying the content of said media data signals in response to said media data signals; and
    a communications processor configured to communicate said meta data separately from said data storage,
    wherein said meta data generation processor is configured to receive a pre-defined list of takes of media data signals to be generated and stored in said data storage and to generate said meta data in association with said list of takes, and said communications processor is configured to communicate said meta data in association with said list of takes.

11. The camera as claimed in claim 10, wherein said meta data generated by said meta data generation processor includes at least one picture which is representative of an image from said recorded media data signals.

12. The camera as claimed in claim 11, wherein said picture is arranged in operation to be associated with an address on said data storage at which said image is recorded, said address forming part of said meta data communicated by said communications processor.

13. A computer-recordable medium having a computer program recorded thereon, the computer program having computer executable instructions, which when loaded on to a data processor configures said data processor to operate as a camera as claimed in claim 10.

14. The camera according to claim 10, wherein said list of takes includes a list of descriptions of contents describing the media data signals to be recorded.

15. A method of generating media data signals representative of a media source, said method comprising the steps of:
    receiving a pre-defined list of takes of media data signals to be generated;
    recording said media data signals on a recording medium corresponding to said list of takes;
    generating meta data identifying the content of said media data signals in response to said media data signals in association with said list of takes; and
    communicating said meta data separately from said recording medium in association with said list of takes.

16. A computer-recordable medium having a computer program recorded thereon, the computer program having computer executable instructions, which when loaded on to a data processor causes the processor to operate in accordance with the method according to claim 15.

17. The method of generating media data signals according to claim 15, wherein said list of takes includes a list of descriptions of contents describing the media data signals to be recorded.

18. A camera configured to generate video signals representative of an image source, said camera comprising:
    a recording processor configured to record said video signals on a recording medium, and
    a meta data generation processor configured to receive said video signals and to generate at least one sample image which is representative of a video image from said recorded video signals, and to associate said sample image with an address on said recording medium at which said video image is recorded,
    wherein said meta data generation processor is configured to receive a pre-defined list of takes of video signals to be generated and to generate said meta data in association with said list of takes, and said communications processor is configured to communicate said meta data in association with said list of takes.

19. The camera as claimed in claim 18, wherein said at least one sample image is first and second sample images, said first of said sample images being generated for a video image at an in point of said at least part of said video signals and said second of said sample images being generated for a video image at an out point of said at least part of said video signals, and said address is a first and second address, said first address indicating the place on said recording medium at which said in point video image is recorded, and said second address indicating the place on said recording medium at which said out point video image is recorded.

20. The camera as claimed in claim 18, comprising:
an activity detector coupled to said meta data generation processor and configured to receive said video signals and to generate an activity signal indicative of a relative change of content of said video signals, wherein
said meta data generation processor is configured to generate a plurality sample images, each of which is representative of a video image from said recorded video signals, said sample images being generated at times of change of content of said video signals indicated by said activity signal, an address of each of said sample images providing the location on said recording medium at which the corresponding video image is recorded.

21. The camera as claimed in claim 20, wherein said activity detector generates said activity signal by forming a histogram of colour components of said video image and determining a rate of change of said colour components.

22. The camera as claimed in claim 20, wherein said activity detector generates said activity signal from motion vectors of image components of said video image signal.

23. The camera as claimed in claim 20, further comprising:
a display processor configured to provide a visible representation of said sample images.

24. The camera as claimed in claim 18, wherein said video signals are representative of a plurality of video material items, and said meta data generation processor is configured to generate a preference marker in response to commands from a user in association with selected ones of said video material items.

25. The camera as claimed in claim 24, wherein said meta data generation processor is configured to record data representative of said preference marker on said recording medium.

26. The camera as claimed in claim 18, comprising:
a data store coupled to said meta data generation processor, said at least one sample image and said address being stored in said data store separately from said recording medium.

27. The camera as claimed in claim 26, wherein data representing a preference marker is stored in said data store in association with the sample image and the address corresponding to a selected video material item.

28. The camera as claimed in claim 18, wherein said recording medium is a random access memory, and said address indicates a place in said memory where said video image is recorded.

29. The camera as claimed in claim 18, wherein said recording medium is a linear recording medium and said address is a time code corresponding to a place on said recording medium where said video image is recorded.

30. The camera as claimed in claim 18, wherein said meta data processor generates said sample images in accordance with a compression encoding process such as the Joint Photographic Experts Group compression encoding process.

31. The camera as claimed in claim 18, wherein said meta data includes a unique identification code for identifying the video signals.

32. The camera as claimed in claim 31, wherein the unique identification code is a UMID.

33. A computer-recordable medium having a computer program recorded thereon, the computer program having computer executable instructions, which when loaded on to a data processor configures said data processor to operate as a camera as claimed in claim 18.

34. The camera according to claim 18, wherein said list of takes includes a list of descriptions of contents describing the media data signals to be recorded.

35. A camera comprising:
a sample image generation processor configured to receive video signals being recorded on to a recording medium, and to generate at least one sample image which is representative of a video image from the video signals being recorded in association with a pre-defined list of takes of video signals, the pre-defined list of takes previously received by the camera, and
an address detector configured to associate the sample image with an address and a corresponding take of the list of takes on the recording medium at which the video image is recorded.

36. The camera as claimed in claim 35, wherein said at least one sample image is first and second sample images, said first of said sample images being generated for a video image at an in point of said at least part of said video signals and said second of said sample images being generated for a video image at an out point of said at least part of said video signals, and said address is a first and second address, said first address indicating the place on said recording medium at which said in point video image is recorded, and said second address indicating the place on said recording medium at which said out point video image is recorded.

37. The camera as claimed in claim 35, comprising:
an activity detector configured to receive said video signals and to generate an activity signal indicative of a relative change of content of said video signals, wherein
said sample image generation processor is configured to generate a plurality sample images, each of which is representative of a video image from said recorded video signals, said sample images being generated at times of change of content of said video signals indicated by said activity signal, an address of each of said sample images providing the location on said recording medium at which the corresponding video image is recorded.

38. The camera as claimed in claim 37, wherein said activity detector generates said activity signal by forming a histogram of colour components of said video image and determining a rate of change of said colour components.

39. The camera as claimed in claim 37, wherein said activity detector generates said activity signal from motion vectors of image components of said video image signal.

40. A computer-recordable medium having a computer program recorded thereon, the computer program having computer executable instructions, which when loaded on to a data processor configures said data processor to operate as a camera as claimed in claim 35.

41. A computer-recordable medium having a computer program recorded thereon, the computer program having computer executable instructions, which when loaded on to a data processor configures said data processor to operate as a camera as claimed in claim 35.

42. The camera according to claim 35, wherein said list of takes includes a list of descriptions of contents describing the media data signals to be recorded.

43. A method of generating video signals representative of an image source, said method comprising the steps of:
   receiving a pre-defined list of takes of video signals to be formed;
   forming said video signals defined in the list of takes;
   recording said video signals on a recording medium;
   generating at least one sample image which is representative of a video image from said recorded video signals; and
   associating said sample image with an address and a corresponding take of the list of takes on said recording medium at which said video image is recorded.

44. A method of generating video signals as claimed in claim 43, wherein the step of generating at least one sample image comprises the step of:
   generating first and second sample images, said first of said sample images being generated for a video image at an in point of said at least part of said video signals and said second of said sample images being generated for a video image at an out point of said at least part of said video signals, and the step of associating said at least one sample image with an address comprises the step of generating a first and second address, said first address indicating the place on said recording medium at which said in point video image is recorded, and said second address indicating the place on said recording medium at which said out point video image is recorded.

45. A method of generating video signals as claimed in claim 44, wherein the step of generating at least one sample image comprises the step of:
   generating an activity signal indicative of a relative change of content of said video signals, and
   generating a plurality sample images, each of which is representative of a video image from said recorded video signals, said sample images being generated at times of change of content of said video signals indicated by said activity signal, and the step of associating said at least one sample image with an address comprises the step of providing the location of each of said plurality of sample images on said recording medium at which the corresponding video image is recorded.

46. A computer recordable medium having a computer program recorded thereon, the computer program having computer executable instructions, which when loaded on to a data processor causes the processor to operate in accordance with the method according to Claim 43.

* * * * *